US010809456B2

(12) United States Patent
Lee

(10) Patent No.: US 10,809,456 B2
(45) Date of Patent: Oct. 20, 2020

(54) ADIABATICALLY COUPLED PHOTONIC SYSTEMS WITH FAN-OUT INTERPOSER

(71) Applicant: Finisar Corporation, Sunnyvale, CA (US)

(72) Inventor: Jin-Hyoung Lee, San Diego, CA (US)

(73) Assignee: II-VI Delaware Inc., Wilmington, DE (US)

( * ) Notice: Subject to any disclaimer, the term of this patent is extended or adjusted under 35 U.S.C. 154(b) by 0 days.

(21) Appl. No.: 16/367,991

(22) Filed: Mar. 28, 2019

(65) Prior Publication Data
US 2019/0310423 A1  Oct. 10, 2019

Related U.S. Application Data

(60) Provisional application No. 62/652,467, filed on Apr. 4, 2018.

(51) Int. Cl.
*G02B 6/122* (2006.01)
*G02B 6/13* (2006.01)
(Continued)

(52) U.S. Cl.
CPC ......... *G02B 6/1228* (2013.01); *G02B 6/1225* (2013.01); *G02B 6/13* (2013.01);
(Continued)

(58) Field of Classification Search
None
See application file for complete search history.

(56) References Cited

U.S. PATENT DOCUMENTS 6,400,494 B1 * 6/2002 Kondo .................. G02F 1/0356
359/237
6,730,944 B1  5/2004 Tandon et al.
(Continued)

FOREIGN PATENT DOCUMENTS

CN  102159975 A  8/2011
CN  103430064 A  12/2013
(Continued)

OTHER PUBLICATIONS

International Search Report and Written Opinion, as issued in connection with International Patent Application No. PCT/US2015/060224, dated May 13, 2016, 11 pgs.
(Continued)

*Primary Examiner* — Tina M Wong
(74) *Attorney, Agent, or Firm* — Maschoff Brennan

(57) ABSTRACT

A photonic system may include a PIC and an interposer. The PIC may include a first SiN waveguide. The interposer may include second and third SiN waveguides substantially vertically aligned with the first SiN waveguide in an overlap region of a first waveguide stack that may include the first, second, and third waveguides in the first waveguide stack. Within the overlap region, the second SiN waveguide may include vertical tapering that increases a thickness of the second SiN waveguide from an initial thickness to an increased thickness toward the first SiN waveguide. The first waveguide stack may further include a non-overlap region in which the interposer does not overlap the PIC. The non-overlap region may include the second and third SiN waveguides. Within the non-overlap region, the second SiN waveguide may maintain the increased thickness and the second and third SiN waveguides may include a first lateral bend.

12 Claims, 16 Drawing Sheets

(51) Int. Cl.
*G02B 6/30* (2006.01)
*G02B 6/12* (2006.01)

(52) U.S. Cl.
CPC .... *G02B 6/305* (2013.01); *G02B 2006/12061* (2013.01); *G02B 2006/12111* (2013.01)

(56) References Cited

U.S. PATENT DOCUMENTS

| | | | |
|---|---|---|---|
| 7,194,016 B2 | 3/2007 | Bullington et al. | |
| 7,532,784 B2 | 5/2009 | Tolshikhin | |
| 8,031,991 B2* | 10/2011 | Webster | G02B 6/1228 385/28 |
| 8,041,164 B2 | 10/2011 | Granestrand | |
| 8,837,885 B2 | 9/2014 | Seo et al. | |
| 9,031,365 B2 | 5/2015 | Park et al. | |
| 9,091,827 B2 | 7/2015 | Verslegers et al. | |
| 9,176,291 B2 | 11/2015 | Li et al. | |
| 9,405,066 B2* | 8/2016 | Mahgerefteh | G02B 6/124 |
| 9,613,886 B2 | 4/2017 | Lin et al. | |
| 9,904,011 B2* | 2/2018 | Hatori | G02B 6/1228 |
| 10,132,997 B2* | 11/2018 | Mahgerefteh | G02B 6/305 |
| 10,317,632 B2* | 6/2019 | Mahgerefteh | G02B 6/12002 |
| 2003/0081902 A1 | 5/2003 | Blauvelt et al. | |
| 2004/0017976 A1 | 1/2004 | Luo et al. | |
| 2004/0240767 A1 | 12/2004 | Kimura et al. | |
| 2009/0297093 A1 | 12/2009 | Webster et al. | |
| 2009/0324163 A1 | 12/2009 | Dougherty et al. | |
| 2010/0006784 A1 | 1/2010 | Mack et al. | |
| 2012/0076465 A1* | 3/2012 | Chen | G02B 6/1228 385/124 |
| 2012/0093456 A1 | 4/2012 | Taillaert et al. | |
| 2012/0230635 A1* | 9/2012 | Yoshida | G02B 6/125 385/43 |
| 2013/0032281 A1 | 2/2013 | Van Den Berg et al. | |
| 2013/0322813 A1 | 12/2013 | Grondin et al. | |
| 2014/0140655 A1 | 5/2014 | Chakravarty et al. | |
| 2014/0270620 A1 | 9/2014 | Anderson et al. | |
| 2014/0286616 A1* | 9/2014 | Heideman | G02B 6/1223 385/131 |
| 2015/0205062 A1 | 7/2015 | Collins et al. | |
| 2015/0285997 A1 | 10/2015 | Pan et al. | |
| 2015/0316720 A1* | 11/2015 | Yang | G02B 6/305 385/14 |
| 2015/0338577 A1 | 11/2015 | Shi et al. | |
| 2016/0018601 A1 | 1/2016 | Gardes et al. | |
| 2016/0041340 A1* | 2/2016 | Shi | G02B 6/1228 385/14 |
| 2016/0047983 A1 | 2/2016 | Collins et al. | |
| 2016/0131837 A1* | 5/2016 | Mahgerefteh | G02B 6/136 385/14 |
| 2016/0294155 A1 | 10/2016 | Zheng et al. | |
| 2017/0075063 A1 | 3/2017 | Brouckaert et al. | |
| 2017/0179680 A1 | 6/2017 | Mahgerefteh et al. | |
| 2017/0207600 A1 | 7/2017 | Klamkin et al. | |
| 2017/0329081 A1 | 11/2017 | Mahgerefteh et al. | |
| 2017/0343734 A1 | 11/2017 | Collins et al. | |
| 2019/0170941 A1* | 6/2019 | Mahgerefteh | G02B 6/12004 |
| 2019/0243066 A1 | 8/2019 | Mahgerefteh et al. | |
| 2019/0310423 A1* | 10/2019 | Lee | G02B 6/305 |

FOREIGN PATENT DOCUMENTS

| | | |
|---|---|---|
| EP | 0389172 A2 | 9/1990 |
| EP | 0561672 A1 | 9/1993 |
| EP | 0623980 A2 | 11/1994 |
| EP | 2664949 A2 | 11/2013 |
| JP | 02-195309 | 8/1990 |
| JP | H05 216079 A | 8/1993 |
| JP | 2003-510656 | 3/2003 |
| JP | 2003-282569 | 10/2003 |
| JP | 2005-115117 | 4/2005 |
| JP | 2006-023385 | 1/2006 |
| JP | 2006-047462 | 2/2006 |
| JP | 2007-052328 | 3/2007 |
| JP | 2014-081587 | 5/2014 |
| JP | 2014-191301 | 10/2014 |
| KR | 20130104838 A | 9/2013 |
| WO | 2001/088577 A1 | 11/2001 |
| WO | 2009/106139 A1 | 9/2009 |
| WO | 2009/106140 A1 | 9/2009 |
| WO | 2010/033435 A2 | 3/2010 |
| WO | 2012/125267 A1 | 9/2012 |
| WO | 2014/112077 | 7/2014 |
| WO | 2016/011002 A1 | 1/2016 |
| WO | 2017/106880 A1 | 6/2017 |

OTHER PUBLICATIONS

International Search Report and Written Opinion, as issued in connection with International Patent Application No. PCT/US2015/060223, dated May 23, 2016, 13 pgs.

International Search Report and Written Opinion, as issued in connection with International Patent Application No. PCT/US2017/064959, dated Mar. 9, 2018, 14 pgs.

European Communication, as issued in connection with European Application No. 15801046.2, dated Jun. 23, 2017, 2 pgs.

European Communication, as issued in connection with European Application No. 15797781.0, dated Jun. 27, 2017, 2 pgs.

Korean Preliminary Rejection, as issued in connection with Korean Application No. 10-2017-7016051, dated Jul. 18, 2017, 12 pgs.

Korean Preliminary Rejection, as issued in connection with Korean Application No. 10-2017-7016051, dated Nov. 16, 2017, 6 pgs.

Korean Preliminary Rejection, as issued in connection with Korean Application No. 10-2017-7016050, dated Jun. 12, 2018, 22 pgs.

Shani et al., "Integrated Optic Adiabatic Polarization Splitter on Silicon", Applied Physics Letters, American Institute of Physics, vol. 56, No. 2, Jan. 8, 1990, pp. 120-121.

Shani et al., "Integrated Optic Adiabatic Devices on Silicon", IEEE Journal of Quantum Electronics, vol. 27, No. 3, Mar. 1991, pp. 556-566.

International Search Report and Written Opinion dated Aug. 5, 2019, in related PCT Application No. PCT/US2019/025876.

\* cited by examiner

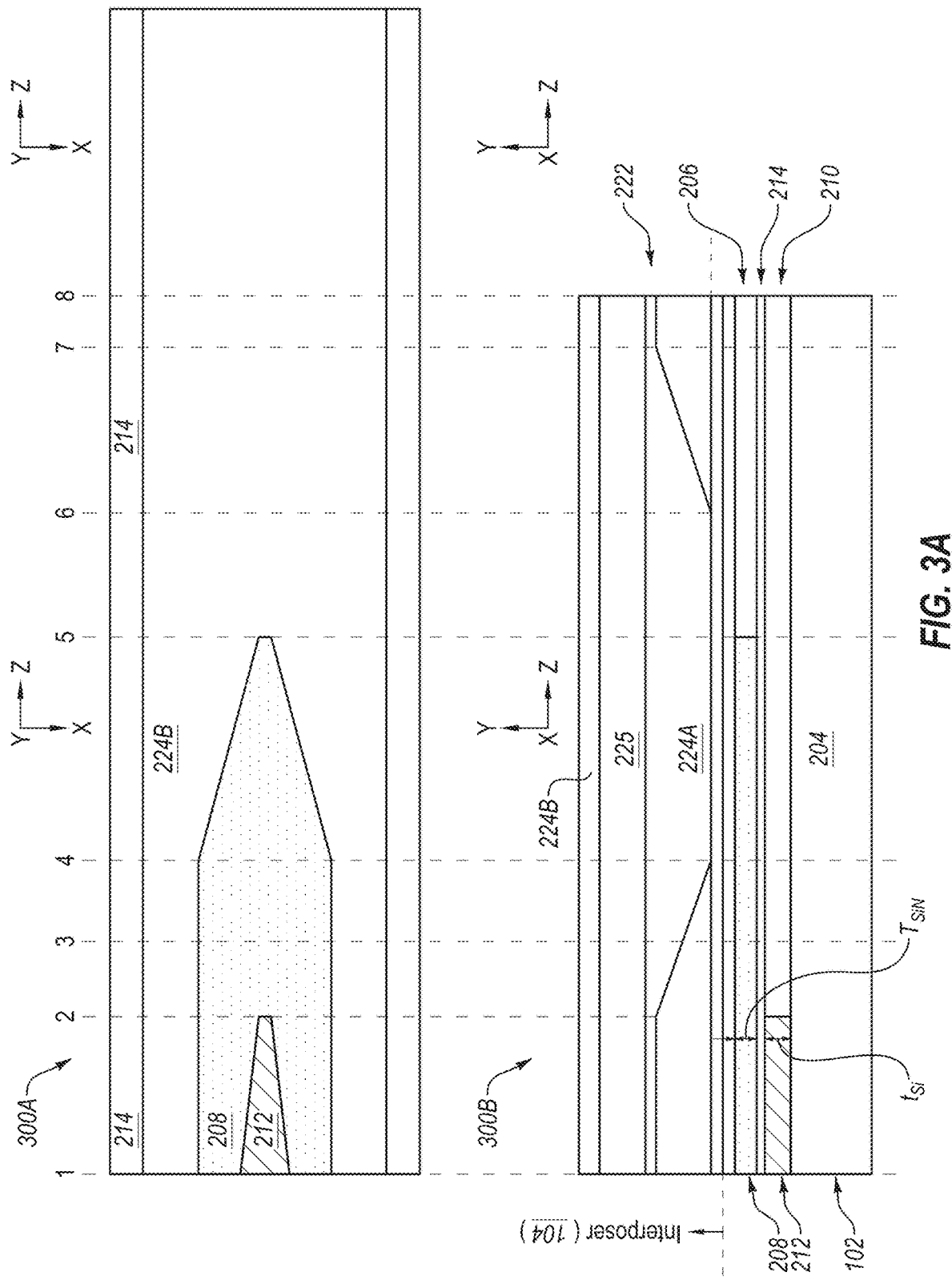

ADIABATICALLY COUPLED PHOTONIC SYSTEMS WITH FAN-OUT INTERPOSER

CROSS-REFERENCE TO RELATED APPLICATION

This application claims the benefit of and priority to U.S. Provisional App. No. 62/652,467, filed Apr. 4, 2018. The 62/652,467 application is incorporated herein by reference.

FIELD

The embodiments discussed herein are related to adiabatically coupled photonic systems.

BACKGROUND

Unless otherwise indicated herein, the materials described herein are not prior art to the claims in the present application and are not admitted to be prior art by inclusion in this section.

One common solution to couple light into or out of a silicon (Si) photonic integrated circuit (PIC) includes a planar or edge coupler. PICs may have multiple parallel signals to increase bandwidth. The parallel signal pitches may not be conducive to direct coupling with multiple transmission elements such as single mode fibers (SMFs).

The subject matter claimed herein is not limited to implementations that solve any disadvantages or that operate only in environments such as those described above. Rather, this background is only provided to illustrate one example technology area where some implementations described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

In an example embodiment, photonic system may include a PIC and an interposer. The PIC may include a first silicon nitride (SiN) waveguide. The interposer may include second and third SiN waveguides substantially vertically aligned with the first SiN waveguide in an overlap region of a first waveguide stack. The overlap region may include the first, second, and third waveguides in the first waveguide stack. Within the overlap region, the second SiN waveguide may include vertical tapering that increases a thickness of the second SiN waveguide from an initial thickness to an increased thickness in a direction toward the first SiN waveguide for adiabatic optical mode transfer between the first and second SiN waveguides. The first waveguide stack may further include a non-overlap region in which the interposer does not overlap the PIC. The non-overlap region may include the second and third SiN waveguides. Within the non-overlap region, the second SiN waveguide may maintain the increased thickness and the second and third SiN waveguides may include a first lateral bend.

In another example embodiment, a fan-out interposer may include first upper and lower SiN waveguides and second upper and lower SiN waveguides. The first lower SiN waveguide may extend parallel to and may be displaced beneath the first upper SiN waveguide. The second lower SiN waveguide may extend parallel to and may be displaced beneath the second upper SiN waveguide. The first lower SiN waveguide may include a first vertical taper that increases in thickness vertically away from the first upper SiN waveguide along a length of the first vertical taper. The first upper and lower SiN waveguides may include a first lateral bend. The second lower SiN waveguide may include a second vertical taper that increases in thickness vertically away from the second upper SiN waveguide along a length of the second vertical taper. The second upper and lower SiN waveguides may include a second lateral bend. The first and second lateral bends may cause the first upper and lower SiN waveguides to laterally diverge from the second upper and lower SiN waveguides.

In another example embodiment, a method may include forming a first waveguide stack that includes first and second SiN waveguides. The first SiN waveguide may include a first vertical taper with an increasing thickness in a direction toward a surface configured for coupling to a first waveguide on a PIC. The first waveguide stack may include a first lateral bend. The method may also include forming a second waveguide stack that includes third and fourth SiN waveguides. The third SiN waveguide may include a first vertical taper with an increasing thickness in a direction toward the surface configured for coupling to a second waveguide on a PIC. The second waveguide stack may include a second lateral bend. The method may also include diverging the first and second lateral bends with respect to the first and second waveguide stacks.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings.

FIGS. 3A-3G include various views of portions of the photonic system of FIGS. 1 and 2.

DETAILED DESCRIPTION OF SOME EXAMPLE EMBODIMENTS

Figure 1A:
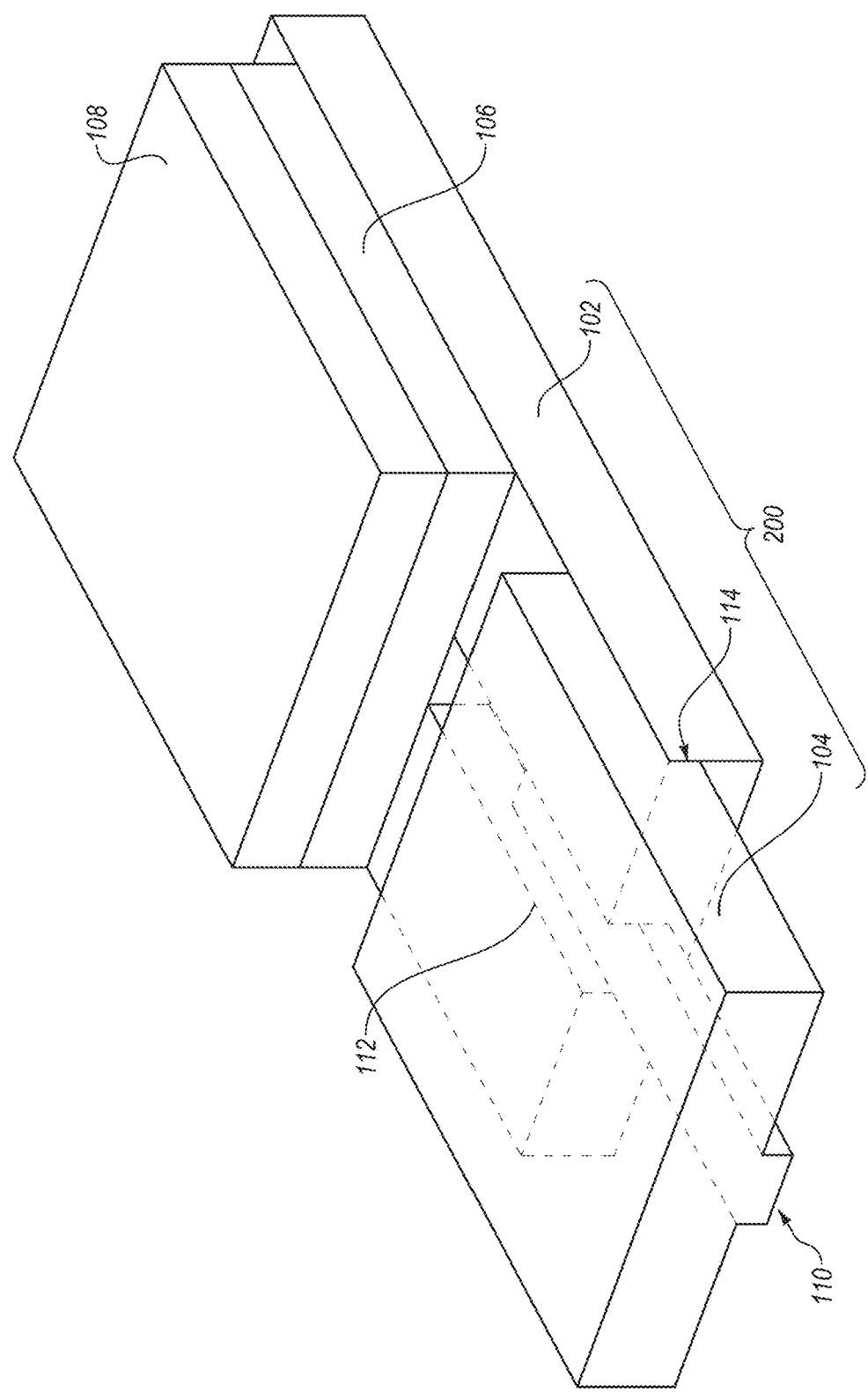
FIG. 1A is a perspective view of an example optoelectronic system (hereinafter "system").

Some embodiments described herein generally relate to adiabatic coupling of light from a silicon (Si) waveguide to an intermediate silicon nitride ($Si_xN_y$, generically referred to herein as SiN) waveguide and then from the SiN waveguide to an interposer waveguide (e.g., SiN, polymer or high-index glass waveguide), or vice versa. For ease of reference in the discussion that follows, the adiabatic coupling is often discussed in the context of a single Si waveguide-to-SiN waveguide-to-interposer waveguide coupling with the understanding that multiple such couplings may be included in a given system. Further, multiple such couplings or multiple waveguide stacks may be configured for parallel transfer of optical signals. Yet further, the multiple waveguide stacks may necessarily be fanned-out in pitch to accommodate coupling with larger dimensioned interfaces, such as for coupling to SMF.

The Si waveguide may have a first optical mode size, a first SiN waveguide may have a second optical mode size substantially larger than the first optical mode size, and an interposer waveguide may have a third optical mode size substantially larger than the second mode size. For example, the first optical mode size may be about 0.3 µm, or in a range between 0.25 µm and 0.5 µm; the second optical mode size may be about 1 µm, or in a range between 0.7 µm and 3 µm; and the third optical mode size may be about 10 µm, or in a range between 8 µm and 12 µm. The third optical mode size may be substantially similar to an optical mode size of a standard single mode optical fiber. For example, a standard single mode optical fiber may have an optical mode size of about 10 µm, which is substantially similar to the third optical mode size.

The Si waveguide may be inverse tapered to a width of about 80 nanometers (nm) to increase a size of the light mode and bring it out into a cladding of the Si waveguide. The first SiN waveguide may be fabricated on a Si photonic integrated circuit (PIC) that includes the Si waveguide. The first SiN waveguide may receive the light from the Si inverse taper. Similar to the Si waveguide, the first SiN waveguide may be inverse tapered to a width of 80-300 nm. The interposer may have multiple interposer waveguides, including second and third SiN waveguides, one or both of which may have approximately a 1 µm core. The second and/or third SiN waveguides of the interposer may be placed in close optical contact with the first SiN waveguide.

Light from the Si waveguide inverse taper may be adiabatically coupled to the first SiN waveguide and then to the interposer including the second and third SiN waveguides in steps along the direction of propagation and may be completely or substantially completely translated to the interposer. The interposer waveguides may be processed on a separate rigid or flexible substrate and may be attached to the first SiN waveguide using various techniques including thermomechanical attachment, or by use of index matching adhesive.

The Si PIC may include modulators, waveguides, detectors, couplers, and other optical components in a Si on Insulator (e.g., silicon on silicon dioxide ($SiO_2$) box layer) on Si substrate. An integrated circuit (IC) may be flip chip bonded (e.g., by a copper pillar) on the Si PIC in a portion of the Si PIC away from a coupling region where the first SiN waveguide and fan-out interposer with the second and third SiN waveguides may be located. The interposer waveguides may be included in a fan-out interposer that may be transparent and/or that may have alignment marks and/or structures to allow ease in optical alignment of the first SiN waveguide on the Si PIC with the interposer waveguides on the fan-out interposer. The interposer waveguides including the second and third SiN waveguides and the first SiN waveguide can be aligned either passively or actively.

The first SiN waveguide may be defined in a fabrication process of the Si PIC to which a $SiN/SiO_2$ layer section is added for coupling and passive functions. A standard Si photonic stack layer has a Si substrate, $SiO_2$ oxide layer (called BOX or $SiO_2$ box), and Si waveguide layer in which Si waveguides are surrounded by $SiO_2$ cladding on one or more sides to confine the light. Embodiments described herein may add a first SiN layer to this standard stack for two stage coupling and optionally passive optical functions. The first SiN layer has regions of SiN core waveguides surrounded by $SiO_2$ cladding on one or more sides to confine the light. SiN has an intermediate index of refraction between indexes of refraction of Si and polymer and so allows efficient adiabatic coupling between the two layers with taper widths that are within critical dimensions of some standard complementary metal-oxide-semiconductor (CMOS) fabs. The low loss of SiN and the lower core/cladding index difference of SiN relative to $SiO_2$ cladding compared to that of Si and $SiO_2$ allows fabrication of passive components with better performance. For example wavelength division multiplexers (WDM mux) and demultiplexers (WDM demux) in SiN have higher channel isolation than in Si. In addition, passive components in SiN have a 5× smaller drift of peak wavelengths with temperatures relative to the same in Si.

In some embodiments, transmit (TX) and receive (RX) Si waveguides on the Si PIC may be in one plane or accessible at one planar interface of the Si PIC whereas an MT connector for parallel single mode fibers can have configurations by multisource agreement (MSA) in which a TX array is in one row and an RX array is in a row below it. It may also be possible for both TX and RX to be in the same row but separated. Embodiments described herein include a fan-out interposer that can connect from the first SiN waveguide inputs/outputs in a plane of the Si PIC and present to, e.g., an MT connector, two vertically separated rows of inputs/outputs.

In some embodiments, wavelength division multiplexing or other passive optical functions may be integrated in a same $SiN/SiO_2$ layer in which the first SiN waveguide is formed. Use of the $SiN/SiO_2$ layer may be advantageous as compared to implementing such optical functions in other layers and/or materials in that it may provide lower loss, better channel isolation due to lower loss in SiN and smaller index difference between core and cladding.

Some embodiments described herein may be wavelength independent over a range of operation. For instance, some embodiments described herein may be wavelength independent over a range of operation of 1310 nm standard long reach (LR) standards, whereas surface grating couplers may have a relatively narrow 20-30 nm pass band.

In some embodiments, light propagating from the Si waveguide to the first SiN waveguide to the interposer including the second and third SiN waveguides may go from the Si waveguide down to the first SiN waveguide and then up into the fan-out interposer including the second and third SiN waveguides, where it may then be coupled into an optical fiber or the like, or light may travel on the reverse path. In these and other embodiments, the interposer waveguides may include SiN, polymer, or high-index glass waveguides having a similar cladding refractive index near 1.5.

In the discussion that follows, numerous embodiments are disclosed. The various embodiments are not mutually exclusive unless context dictates otherwise. For instance, a portion or all of one or more embodiments may be combined with a portion or all of one or more other embodiments unless context dictates otherwise.

Reference will now be made to the drawings to describe various aspects of example embodiments of the invention. It is to be understood that the drawings are diagrammatic and schematic representations of such example embodiments, and are not limiting of the present invention, nor are they necessarily drawn to scale.

FIG. 1A is a perspective view of an example optoelectronic system 100 (hereinafter "system 100"), arranged in accordance with at least one embodiment described herein. As illustrated, the system 100 includes a Si PIC 102, a fan-out interposer 104, a three-dimensional (3D) stack region 106, and a flip chip bonded integrated circuit (IC) 108. The Si PIC 102 and the fan-out interposer 104 together form a two-stage adiabatically coupled photonic system 200 (hereinafter "photonic system 200").

In general, the Si PIC 102 may include one or more optical elements, such as a modulator, waveguide, coupler, or other optical element(s) in a Si-on-insulator substrate.

In general, the 3D stack region 106 may provide electrical connections to one or more active optical components of the Si PIC 102. Accordingly, the 3D stack region 106 may include, e.g., metallized pillars, traces, and/or contacts as well as insulative dielectric and/or other materials and elements.

In general, the flip chip bonded IC 108 may include one or more active and/or passive electrical devices that may be communicatively coupled through the 3D stack region 106 to the one or more active optical components of the Si PIC 102.

The fan-out interposer 104 may be mechanically coupled to the Si PIC 102, or may be integrally formed using layer deposition to the Si PIC 102. A fan-out interposer SiN waveguide of the fan-out interposer 104 and a SiN waveguide and Si waveguide of the Si PIC 102 may be configured to adiabatically couple light into or out of the Si PIC 102. As used herein, light may be adiabatically coupled from one optical component or device, herein called the 'initial state' waveguide to another, herein called the final state waveguide, in a transitional interaction region, sometimes referred to herein as an adiabatic coupler region.

Mechanical alignment of the fan-out interposer 104 with the Si PIC 102 may include and/or be facilitated by an alignment tongue 110 formed on, for example, the fan-out interposer 104 that is received in a groove 112 formed, for example, in the Si PIC 102. Further mechanical alignment may be provided by forming stops 114, for example, in the fan-out interposer 104 to restrict longitudinal placement. While tongues, grooves, and stops are illustrated on specific ones of the fan-out interposer 104 and the Si PIC 102, it is also contemplated that the placements may be reversed or otherwise placed to accomplish alignment of the fan-out interposer 104 with the Si PIC 102. Further, retention through bonding is also contemplated either exclusive or inclusive of the mechanical alignment discussed herein.

To transfer optical power from the initial state waveguide to the final state waveguide one or more optical properties of either or both initial and final state waveguides, such as width, height, effective refractive index, etc., are varied along the optical axis. Herein the initial state and final state waveguides form one system within the transitional interaction region and light remains in a single mode of the joint system while it physically gets transferred from the initial state waveguide to the final state waveguide. The initial state and final state waveguides may respectively correspond to the Si waveguide and the SiN waveguide, or vice versa. Alternatively or additionally, the initial and final state waveguides may respectively correspond to the SiN waveguide and the interposer waveguide, or vice versa. Alternatively or additionally, two components may be said to be adiabatically coupled together or to each other when the two components are configured as described herein to form an adiabatic coupler region.

Moreover, light is used generically herein to refer to electromagnetic radiation of any suitable wavelength, and may include light with wavelengths of, e.g., about 800-900 nm, 1200-1360 nm, 1360-1460 nm, 1530-1565 nm, or other suitable wavelengths. Light can also have TE and/or TM polarization.

In these and other implementations, the SiN waveguide in the Si PIC 102 may be aligned with and optically coupled to the interposer waveguide in the fan-out interposer 104. Additionally, the interposer waveguide in the fan-out interposer 104 may be aligned with and optically coupled to the SiN waveguide in the Si PIC 102. The Si waveguide may have a first index of refraction n1. The SiN waveguide may have a second index of refraction n2. The fan-out interposer waveguide may have a third index of refraction n3. In general, the second index of refraction n2 of the SiN waveguide may be intermediate between the first index of refraction n1 of the Si waveguide and the third index of refraction n3 of the fan-out interposer waveguide. In addition, n1>n2>n3. In some embodiments, for a two-stage adiabatically coupled photonic system with three waveguides, each with a corresponding one of the indexes of refraction n1, n2, n3, the first index of refraction n1 may be in a range of 3 to 3.5, the second index of refraction n2 may be in a range of 1.8 to 2.2, and the third index of refraction n3 may be in a range of 1.49 to 1.6.

The interposer waveguide in the fan-out interposer 104 may additionally or alternatively be aligned with and optically coupled to an input and/or output for one or more optical signals. An example input source may include an optical signal source (e.g., a laser), an optical fiber, a fiber end connector, a lens, or other optical component or device from which incoming optical signals (e.g., signals coming toward the Si PIC 102) are provided to the fan-out interposer 104 for input to the Si PIC 102. An example output device to which output may be sent may include a laser, an optical receiver (e.g., a photodiode), an optical fiber, a fiber end connector, a lens, or other optical component or device to which outgoing signals (e.g., signals leaving the Si PIC 102) may be provided through the fan-out interposer 104. One or more of the active optical components of the Si PIC 102 may generate or otherwise be the source of outgoing signals that are outputted from the photonic system 200 through the Si waveguide, the SiN waveguide, and the interposer waveguide. Alternately or additionally, one or more of the active optical components of the Si PIC 102 may be configured to receive and process incoming signals that are inputted to the photonic system 200 through the interposer waveguide, the SiN waveguide, and the Si waveguide.

Figure 1B:
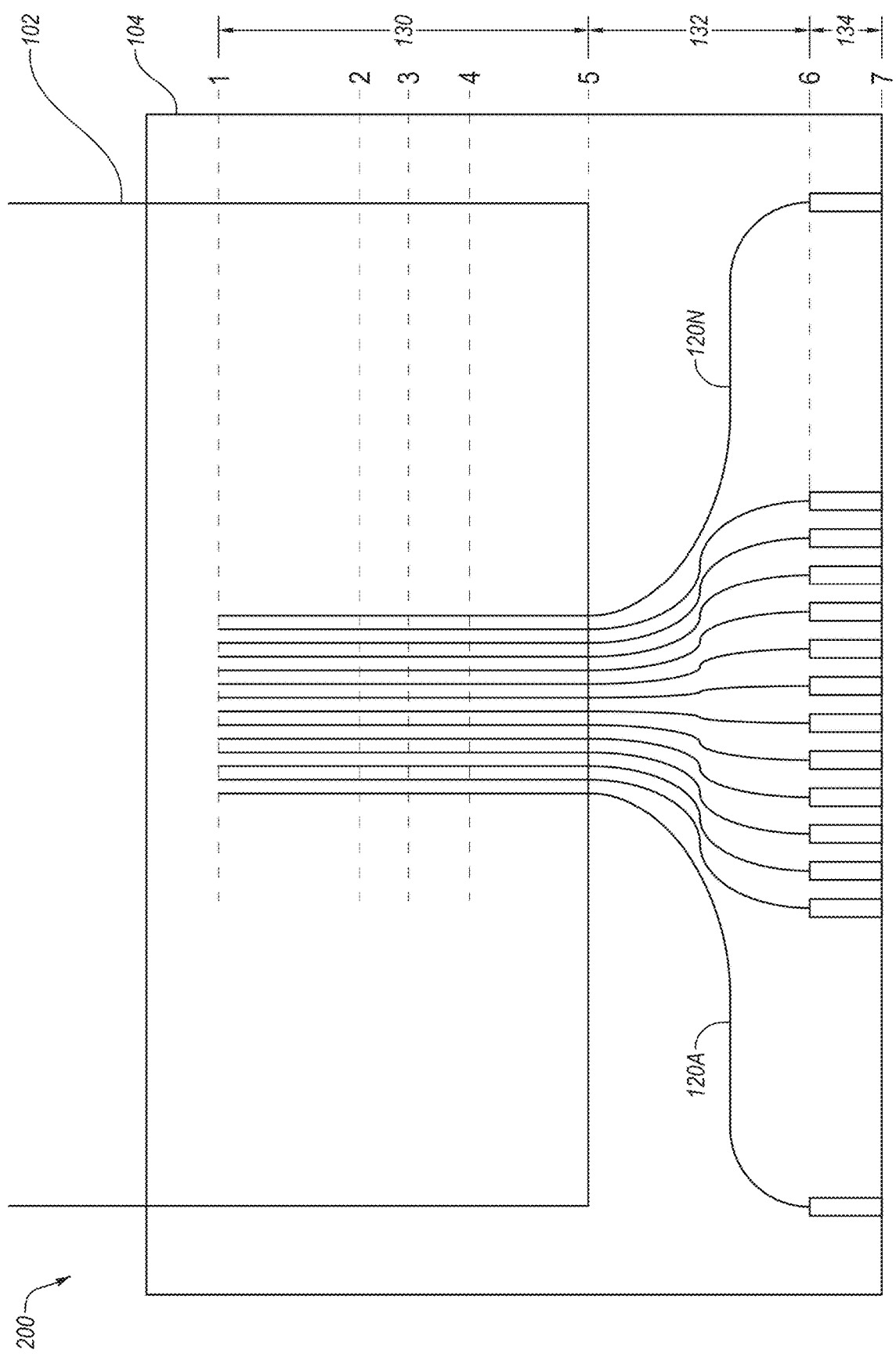
FIG. 1B is a top view of a fan-out interposer and a PIC of the example system of FIG. 1A.

FIG. 1B is a top view of the fan-out interposer 104 and the PIC 102 of the example system 100 of FIG. 1A, arranged in accordance with at least one embodiment described herein. The photonic system 200 includes the Si PIC 102 and the fan-out interposer 104 to fan out multiple optical signals. By way of example, the Si PIC 102 may include an end with a width of approximately 8 mm for overlapping with the fan-out interposer 104. Multiple third SiN waveguides 120A-120N are illustrated as fanning-out from a smaller pitch at an interface with the Si PIC 102 to a larger pitch at an interface exiting the fan-out interposer 104. The interposer 104 may additionally include second SiN waveguides which may generally run beneath the third waveguides 120 and hence are not visible in FIG. 1B. The third SiN waveguides 120A-120N are illustrated as traversing regions 130, 132, and 134. By way of example, the region 130 may be an overlap region between the PIC 102 and the fan-out interposer 104 and may have a length on the order of 3 mm in length, while each of the regions 132 and 134 may each have a length on the order of 1 mm. The regions 132 and 134 may form a non-overlap region where the PIC 102 and the fan-out interposer 104 do not overlap, e.g., in the light propagation direction.

Generally and as further described in detail below, first SiN waveguides (not shown in FIG. 1B) formed as part of Si PIC 102 in region 130 are adiabatically respectively coupled to the second SiN waveguides of the fan-out interposer 104. The second SiN waveguides in region 132 may be formed as high-contrast waveguides which accommodate bending of the second SiN waveguides without excessive dispersion of the optical signals. In the region 134, the second SiN waveguides may be subjected to a vertical tapering of the second SiN waveguides resulting in an adiabatic coupling of the respective optical signals to the third SiN waveguides 120. The third SiN waveguides 120 may then be optically coupled to respective single mode fibers (not shown in FIG. 1B).

A pitch of the SiN waveguides 120 in the region 130 may be on the order of about 100 μm. After the fan-out of the third SiN waveguides 120 in the region 132, the pitch of the SiN waveguides 120 in the region 134 may be on the order of about 250 μm.

While the pitches described herein provide specific values and/or ranges, the waveguide pitch can be varied with specific designs. The disclosed embodiment allow the pitches to be defined as necessary for specific purposes as a result of the high-contrast (increased thickness) waveguide. While narrow pitches for waveguides may be preferred to minimize the footprint in the PIC, larger pitches, such as 250 μm may be useful for coupling with industry standard fiber specifications.

By way of example, the SiN waveguides 120 may be configured as a 14-channel interface including twelve fiber channels and two laser channels. The fan-out interposer 104 may have dimensions of about 8 mm wide by 5 mm in length, with approximately 3 mm of the fan-out interposer 104 overlapping with the Si PIC 102. Further, the fan-out interposer 104 may be flip-chip bonded to the Si PIC 102 and the fan-out interposer 104 may be partially etched to provide the stops 114 described above. Further, the fan-out interposer 104 may be formed to include the tongue 110 and the Si PIC 102 may be formed to include the groove 112, as described above.

FIG. 1B further illustrates various reference lines 1-7 for identifying various cross-sectional views illustrated below with respect to FIG. 2 and FIGS. 3A-3G. While FIG. 1B illustrates multiple SiN waveguides 120, the cross-sectional views of FIG. 2 and FIGS. 3A-3G is each limited to a single waveguide stack for simplicity.

Figure 2:
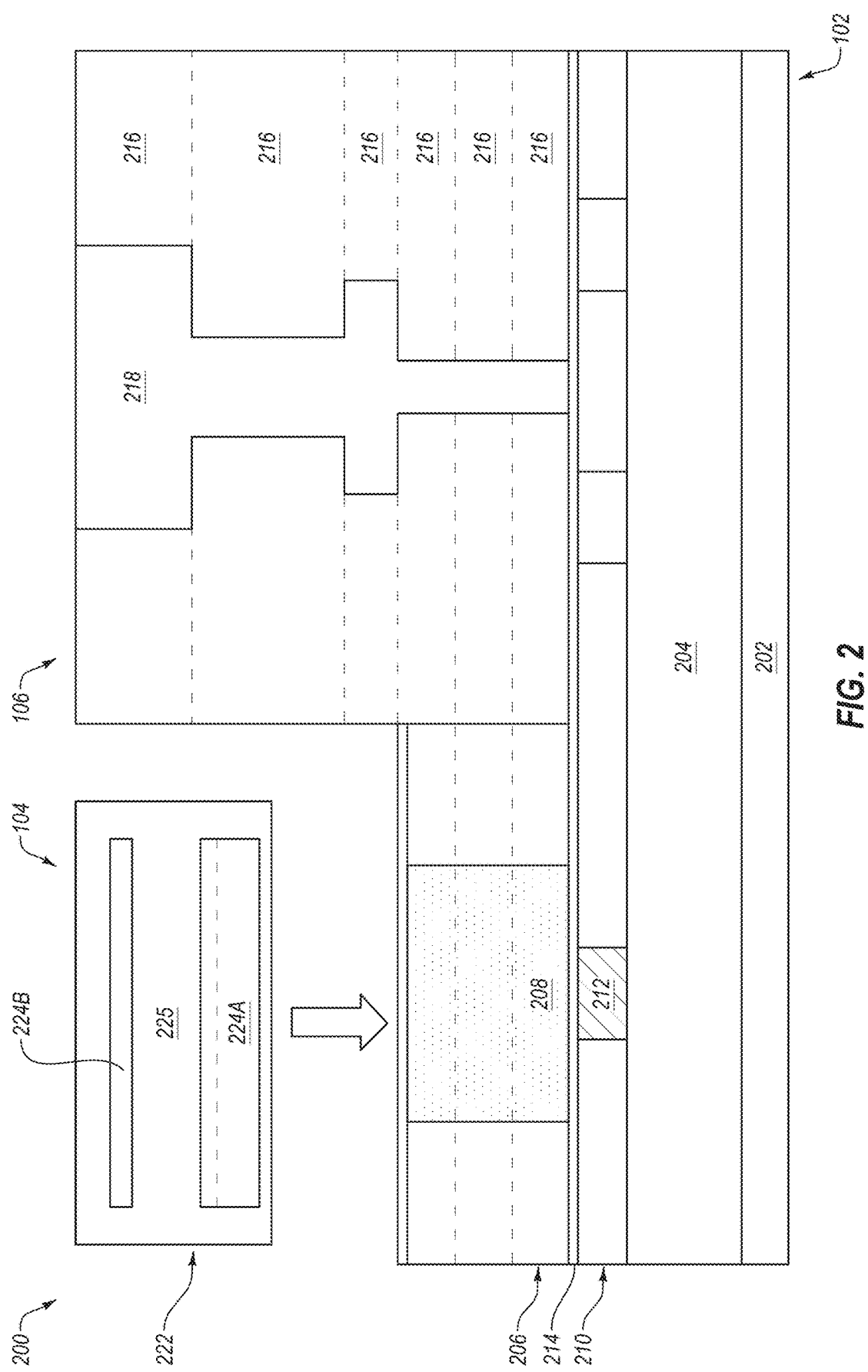
FIG. 2 is a side view of an example two-stage adiabatically coupled photonic system (hereinafter "photonic system") of FIG. 1.

FIG. 2 is a side view of the photonic system 200 of FIG. 1A, arranged in accordance with at least one embodiment described herein. The photonic system 200 includes the Si PIC 102 and the fan-out interposer 104. FIG. 2 additionally illustrates the 3D stack region 106.

The Si PIC 102 includes a Si substrate 202, a $SiO_2$ box 204, a first layer 206 that includes one or more SiN waveguides 208, and a second layer 210 that includes one or more Si waveguides 212. In the illustrated embodiment, the first and second layer 206 and 210 are both formed above the $SiO_2$ box 204. In particular, the first layer 206 is formed on (or at least above) the second layer 210 and the second layer 210 is formed on (or at least above) the $SiO_2$ box 204. Alternatively or additionally, a slab 214 of SiN may be formed between the first layer 206 and the second layer 210 at least in a region where the Si waveguide 212 is optically coupled to the first SiN waveguide 208. In an example embodiment, the first SiN waveguide 208 includes $Si_3N_4$ as the waveguide core surrounded on at least two sides along its length by $SiO_2$ or other suitable waveguide cladding.

Although not illustrated in FIG. 2, the Si PIC 102 may further include one or more active optical components formed in the second layer 210. In these and other embodiments, the Si PIC 102 may further include one or more dielectric layers 216 formed on and/or above the second layer 210, and one or more metallized structures 218 formed in the dielectric layers 216. The metallized structures 218 may extend from a top of the Si PIC 102 through the dielectric layers 216 to electrical contact with the active optical components formed in the second layer 210 or elsewhere in the Si PIC 102. The dielectric layers 216 may include $SiO_2$ or other suitable dielectric material. The dielectric layers 216 and the metallized structures 218 are collectively an example of the 3D stack region 106.

With combined reference to FIGS. 1A and 2, the flip chip bonded IC 108 may be flip chip bonded to the 3D stack region 106. The flip chip bonded IC 108 may include one or more active and/or passive electrical devices that may be communicatively coupled through the 3D stack region 106 to the one or more active optical components formed in the second layer 210 of the Si PIC 102.

The fan-out interposer 104 may include a waveguide strip 222 comprised of one or more fan-out interposer waveguides 224. Each waveguide strip 222 includes a first interposer core waveguide, identified herein as a second SiN waveguide 224A, an interposer cladding 225 with a different index of refraction than the second SiN waveguide 224A, and a second interposer core waveguide, identified herein as a third SiN waveguide 224B. The second SiN waveguide 224A may include, correspond to, or be included in any of the second SiN waveguides discussed with respect to FIG. 1B. The third SiN waveguide 224B may include, correspond to, or be included in any of the third SiN waveguides 120 discussed with respect to FIG. 1B. A coupler portion of the second SiN waveguide 224A of the fan-out interposer may be disposed above a laterally tapered end of the first SiN waveguide 208 in the first layer 206 and may be aligned with the laterally tapered end of the first SiN waveguide 208, as described in more detail below.

Each waveguide described herein may include a waveguide core and cladding on one or more sides of the waveguide core. Many of the structures and parameters of various waveguides described herein specifically apply and/or refer to the corresponding waveguide core unless context indicates otherwise. For example, the first SiN waveguide 208 may have a laterally tapered end as already described above, meaning the first SiN waveguide 208 may have a waveguide core, e.g., of SiN, where the waveguide core has a laterally tapered end.

The Si waveguide 212 (or more particularly, the core of the Si waveguide 212) may have the first index of refraction $n_1$ mentioned above. The SiN waveguide 208 (or more particularly, the core of the SiN waveguide 208) may have the second index of refraction $n_2$ mentioned above. The fan-out interposer waveguide strip 222 (or more particularly, the second SiN waveguide 224A and the third SiN waveguide 224B) may have the third index of refraction $n_3$ mentioned above, where $n_1 > n_2 > n_3$. The spatial separation of the interposer 104 from the Si PIC 102 in FIG. 2 is illustrative of separate functional entities as, in at least one embodiment, the interposer 104 may be formed directly onto the Si PIC 102 using, for example, deposition processes.

FIGS. 3A-3G include various views of portions of the photonic system 200 of FIG. 2, arranged in accordance with at least one embodiment described herein. In particular, FIG. 3A includes an overhead view 300A and a longitudinal cross-sectional view 300B and FIG. 3B includes transverse cross-sectional views 300C-300H at some locations respectively denoted by reference lines 1-7 in FIG. 1B and FIG. 3A. FIGS. 3A-3G illustrate a single waveguide strip while multiple parallel waveguide strips illustrated in FIG. 1B is contemplated. Each of the parallel waveguide strips is similarly configured in accordance with FIGS. 3A-3G.

Figure 3B:
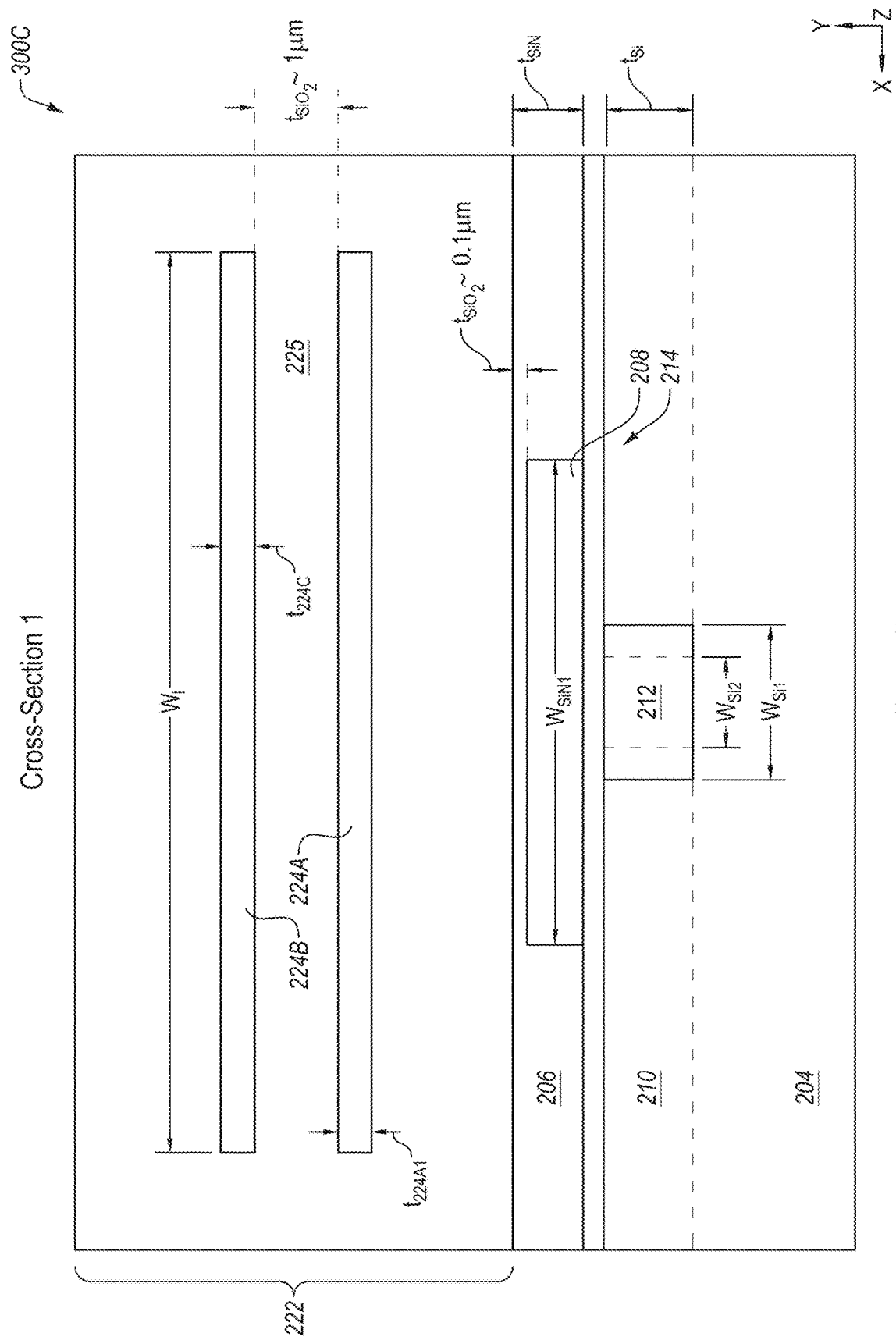

The overhead view 300A of FIG. 3A illustrates relative x-axis and z-axis alignment of various components with respect to each other according to an arbitrarily defined x-y-z coordinate axis provided within each of the views 300A-300B of FIG. 3A and provided in other Figures herein. A single instance of the x-y-z coordinate axis is provided for all views 300C-300H of FIGS. 3B-3G since all views 300C-300H have the same orientation. The x direction may sometimes be referred to as a lateral or transverse direction and terms such as width, lateral, transverse, side, sideways etc., may be used to refer to, e.g., dimensions, relative position, and/or movement in the x direction unless context dictates otherwise. The y direction may sometimes be referred to as a vertical direction and terms such as height, thickness, vertical, vertically, above, below, up, down, etc., may be used to refer to, e.g., dimensions, relative position, and/or movement in the y direction unless context dictates otherwise. The z direction may sometimes be referred to as a longitudinal or light-propagating direction and terms such as length, longitudinal, upstream, downstream, forward, backward, front, back, etc., may be used to refer to, e.g., dimensions, relative position, and/or movement in the z direction unless context dictates otherwise.

The longitudinal cross-sectional view 300B of FIG. 3A illustrates an example material stack up for the various components. The overhead view 300A of FIG. 3A includes outlines or footprints of the various components at different levels in the material stack up that may not necessarily be visible when viewed from above, but are shown as outlines or footprints to illustrate the x and z alignment of the various components with respect to each other.

The portion of the photonic system 200 of FIG. 2 illustrated in the overhead view 300A of FIG. 3A includes a tapered end of the Si waveguide 212. The tapered end of the Si waveguide 212 is relatively wider at reference line 1 than at reference line 2. The tapered end of the Si waveguide 212 may be considered to have a taper or an inverse taper, which are structurally equivalent. As used herein, a waveguide such as the Si waveguide 212 of FIG. 3A may be considered to have a taper with respect to outgoing optical signals, e.g., optical signals that enter the waveguide at a relatively wider portion of the waveguide and propagate through the waveguide towards a relatively narrower portion of the waveguide. In comparison, a waveguide such as the Si waveguide 212 of FIG. 3A may be considered to have an inverse taper with respect to incoming optical signals, e.g., optical signals that propagate through the waveguide in the direction from narrower to wider to exit the waveguide. For simplicity in the discussion that follows, the term "taper" and its variants should be broadly construed as a variation of the waveguide width along the optical axis. In some embodiments, it may be advantageous to vary the width of the waveguide along the optical axis linearly or nonlinearly or in segments of linear and nonlinear variation. The width of the taper around the interaction region of the initial state and final state waveguides may be varied to optimize coupling or reduce the length of the coupling region to produce a physically smaller device.

The Si waveguide 212, including the tapered end, may be formed in the second layer 210 and positioned below the first layer 206 that includes the first SiN waveguide 208. For example, the second layer 210 may be positioned below the SiN slab 214, which in turn is positioned below the first layer 206. Within the second layer 210, $SiO_2$ may generally be disposed adjacent to sides of the Si waveguide 212 (e.g., in the positive x and negative x directions), as illustrated in the views 300C of FIG. 3B, to form a cladding for the Si waveguide 212, which serves as the core. In some embodiments, the Si waveguide 212 and/or other Si waveguides of the Si PIC 102 may have a thickness $t_{Si}$ (e.g., in the y direction) of approximately 0.3 μm and an index of refraction of about 3.4. The specific values of indexes of refraction, thickness, width, length, and other values provided herein are provided by way of example only and values other than those explicitly stated may nevertheless fall within the scope of the described embodiments.

As illustrated in FIG. 3A, the SiN slab 214 may be formed or otherwise located on the second layer 210 that includes the Si waveguide 212. The SiN slab 214 may have a thickness (e.g., in they direction) of approximately 0-50 nm in some embodiments.

The view 300B of FIG. 3A further illustrates the first SiN waveguide 208. The first SiN waveguide 208 includes both a coupler portion and a tapered end. The coupler portion of the first SiN waveguide 208 generally includes the portion of the first SiN waveguide 208 between reference lines 1 and 3 and the tapered end of the first SiN waveguide 208 generally includes the portion of the first SiN waveguide 208 between reference lines 4 and 5. The tapered end of the first SiN waveguide 208 is relatively wider at reference line 4 than at reference line 5.

Figure 3C:
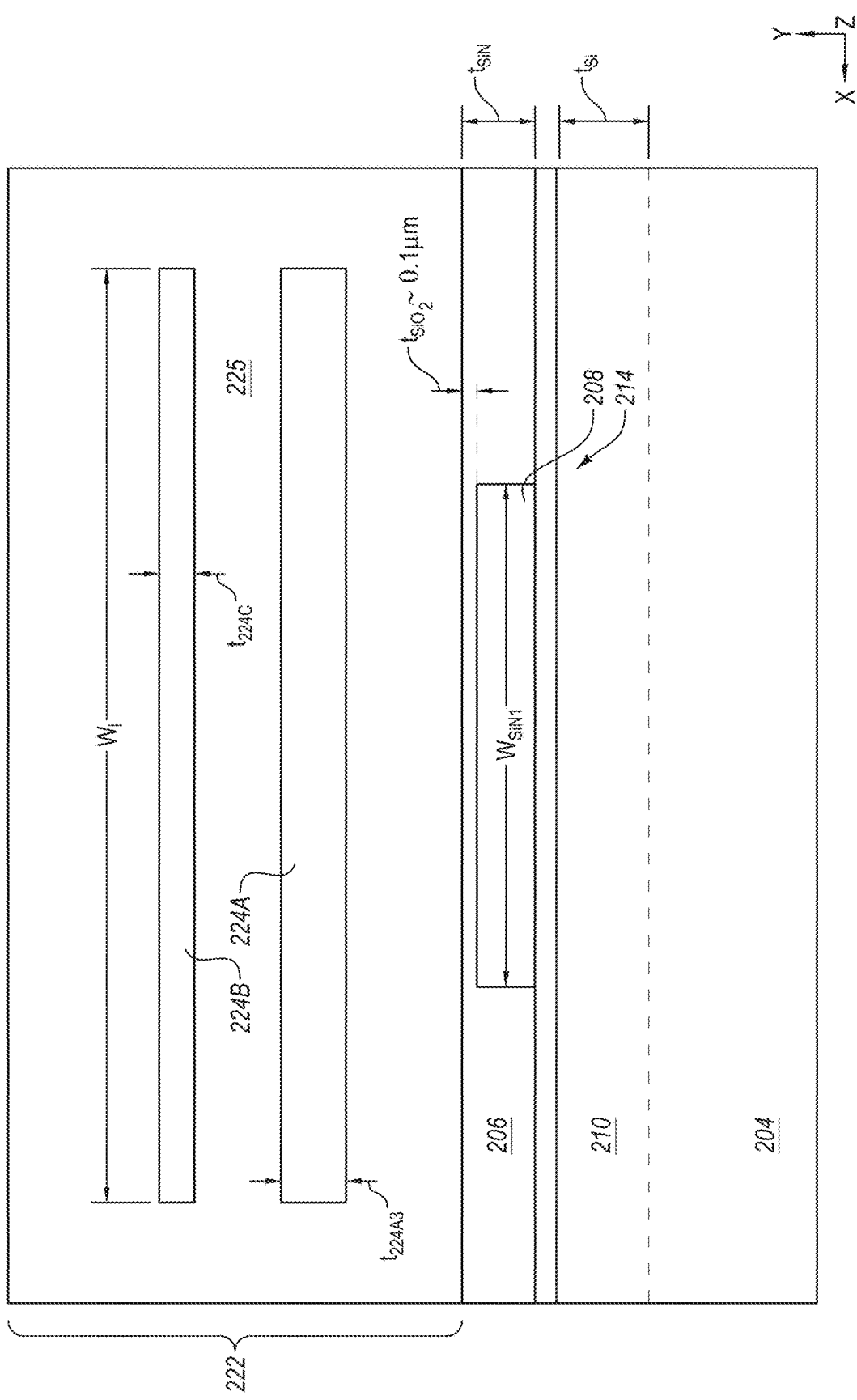
Figure 3D:
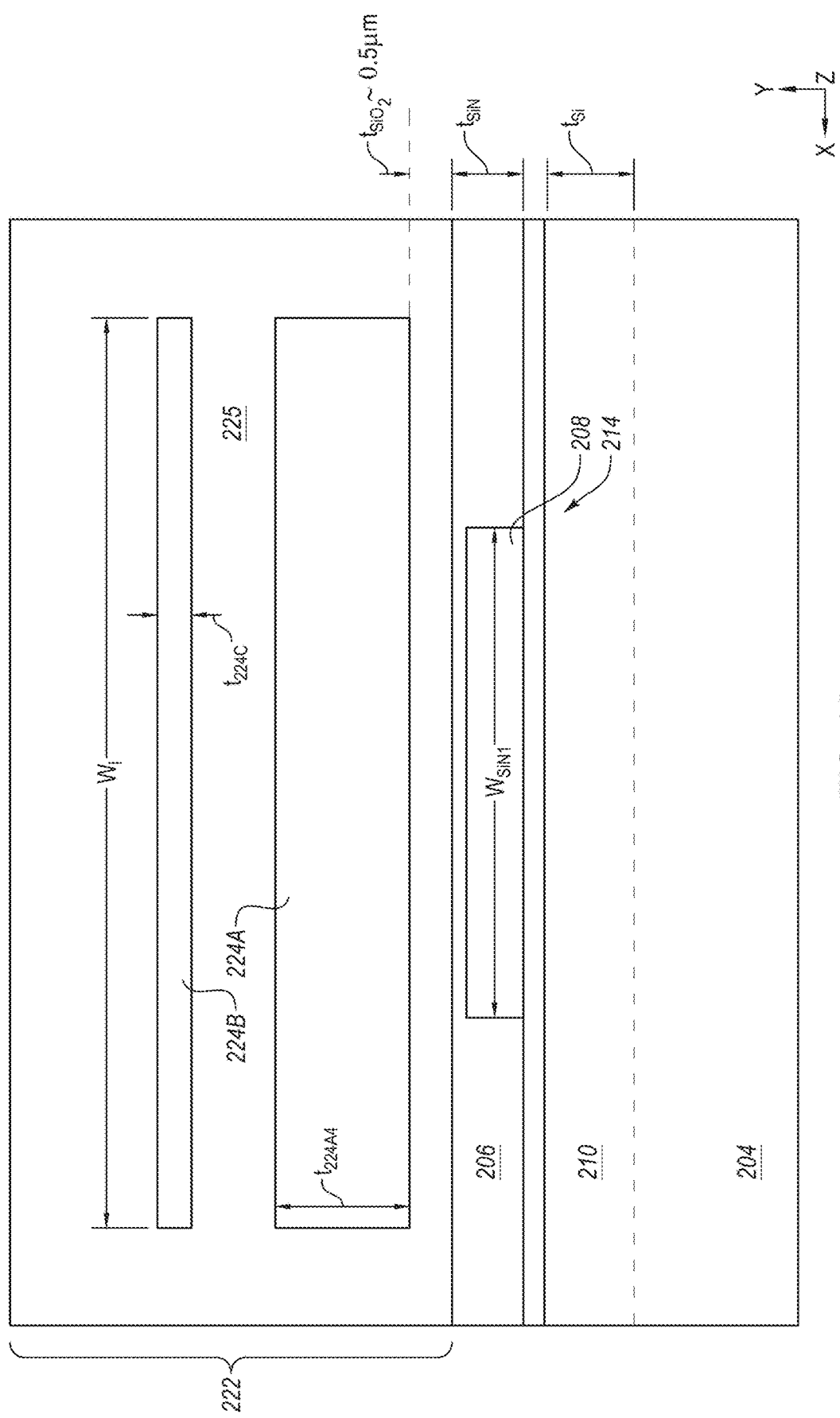
Figure 3E:
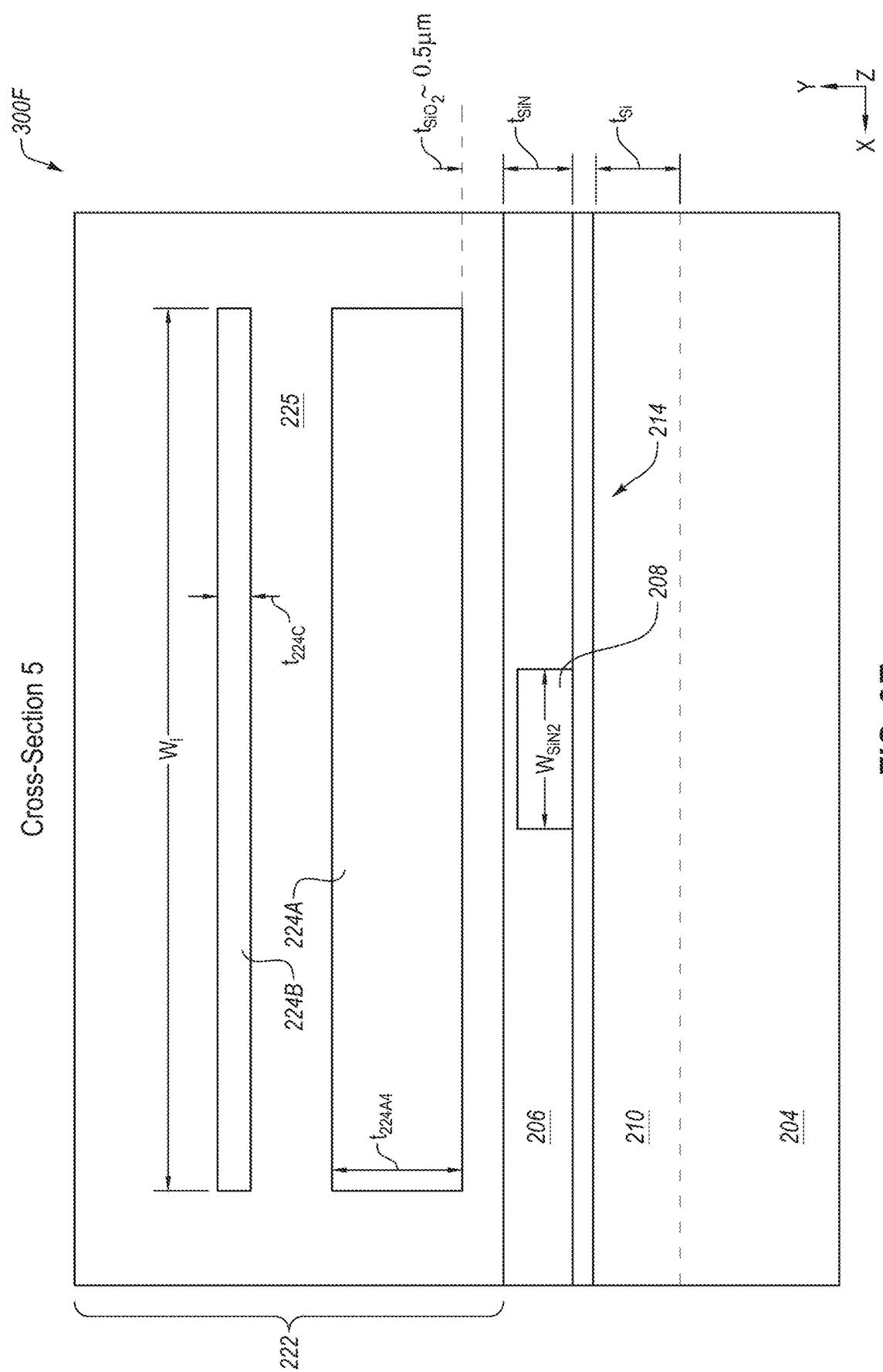
Figure 3F:
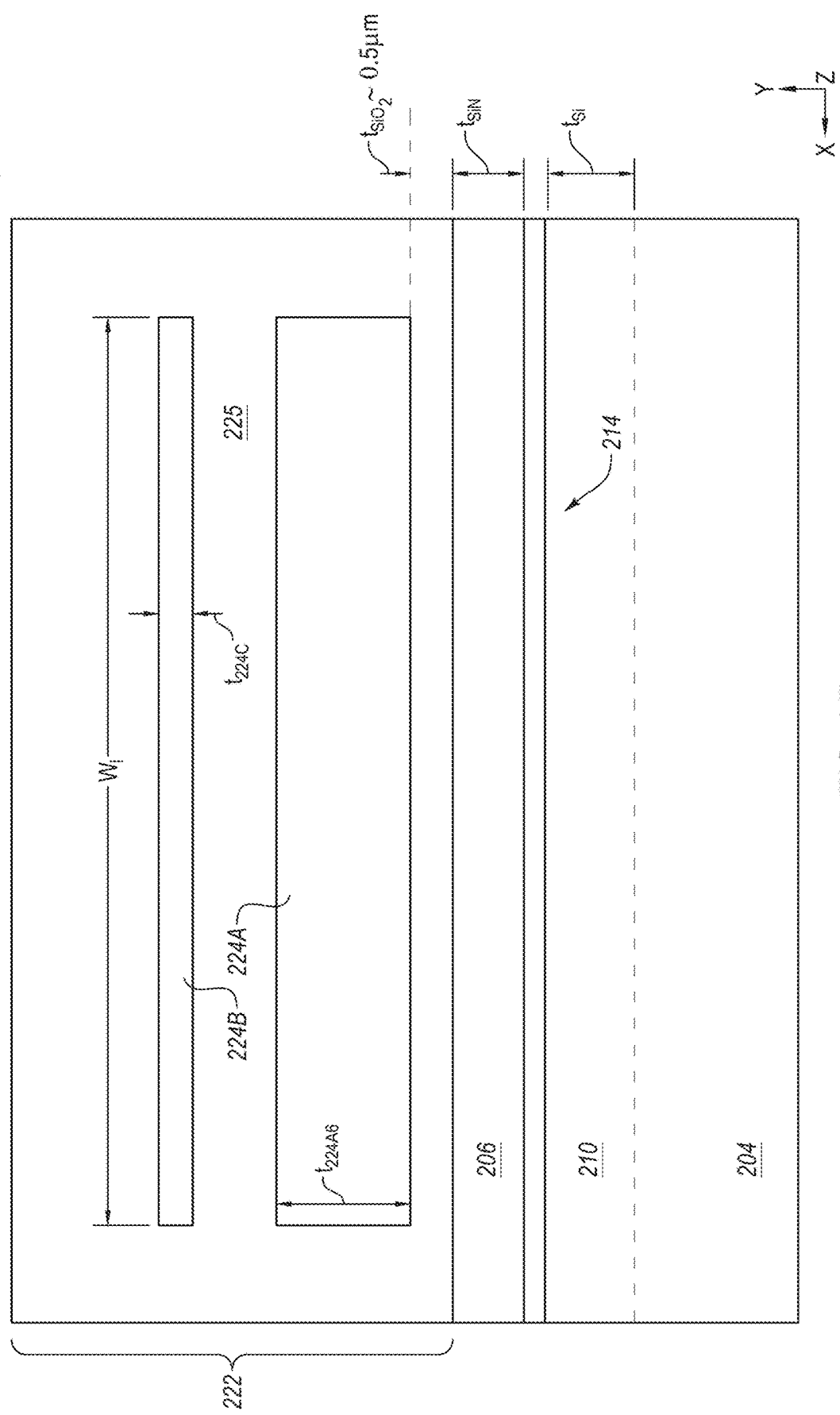

Within the first layer 206, $SiO_2$ may generally be disposed adjacent to sides of the first SiN waveguide 208 (e.g., in the positive x and negative x directions), to serve as a cladding layer for the first SiN waveguide 208, as illustrated in the views 300C of FIG. 3B through 300F of FIG. 3E. In some embodiments, the first SiN waveguide 208 and/or other SiN waveguides of the first layer 206 may have a thickness (e.g., in the z direction) of approximately 0.5-1 μm and an index of refraction of about 1.99.

The waveguide strip 222 may have a high contrast may have a high contrast, e.g., between reference lines 5-6 and/or in other locations along its length. The high contrast of waveguide strip 222 between reference lines 5 and 6 allows the waveguide strip 222, including the second SiN waveguide 224A and the third SiN waveguide 224B, to be formed into a fan-out configuration as illustrated in FIG. 1B. The high contrast waveguide strip 222, including the third SiN waveguide 224B with its increased thickness, allows the waveguide strip to be formed with tight bends without optical dispersion of an optical signal as would occur in a low contrast waveguide strip.

It can be seen from FIG. 3A that, although the first SiN waveguide 208 is displaced in the y direction from the Si waveguide 212, the tapered end of the Si waveguide 212 may be aligned in the x and z directions with the coupler portion (substantially between reference lines 1 and 2) of the first SiN waveguide 208 such that the tapered end of the Si waveguide 212 establishes the coupler portion of the SiN waveguide 208 (as seen in the view 300A) in the x and z directions and is parallel thereto (as seen in the view 300B).

FIG. 3A additionally illustrates interposer waveguide strip 222. The interposer waveguide strip 222 includes the second SiN waveguide 224A, cladding 225, and the third SiN waveguide 224B. Additionally, the second SiN waveguide 224A includes a first vertically tapered portion (substantially between reference lines 2 and 4), a high-contrast coupler portion (substantially between reference lines 4 and 6), a second vertically tapered portion (substantially between reference lines 6 and 7), and a low-contrast fiber coupler portion (substantially extending beyond reference line 7).

The photonic system 200 includes a first optical mode portion generally located to the left of reference line 1 where an optical signal propagates by optical mode in the Si waveguide 212. The photonic system 200 includes a first coupler portion in the Si PIC 102 generally located between reference lines 1 and 2 where an optical mode of the optical signal in the Si waveguide 212 is transferred to the first SiN waveguide 208. The photonic system 200 includes a second coupler portion generally located between reference lines 4 and 5 where an optical mode of the optical signal in the first SiN waveguide 208 is transferred to the second SiN waveguide 224A in the interposer 104. The photonic system 200 further includes a second optical mode portion generally located between reference lines 5 and 7 where the optical signal propagates in an optical mode. The photonic system 200 further includes a third coupler portion generally located between reference lines 7 and 8 where the optical signal is converted into fiber mode in both the second SiN waveguide 224A and the third SiN waveguide 224B.

The interposer waveguide strip 222 includes the interposer waveguides 224A and 224B and generally includes the portion of the interposer waveguides 224A and 224B between reference lines 1 and 8 and may extend away from a coupler portion (e.g., to the right in FIG. 3A). The interposer waveguides 224A and 224B may be formed and therefore coupled, along with potentially one or more other interposer waveguides, to the Si PIC 102 of FIG. 2. In some embodiments, the interposer waveguide 224A may have a thickness $t_{224A}$ (e.g., in the y direction) that varies between, for example, 20 nm to 250 nm, and an index of refraction of about 1.986 for the interposer core 224A and about 1.446 for the interposer cladding 225. The interposer waveguide 224B may have a thickness $t_{224B}$ (e.g., in the y direction), for example, of 20 nm, and an index of refraction of about 1.986 for the interposer core 224B and about 1.446 for the interposer cladding 225. Further, the index of refraction of the interposer cores 224A and 224B are greater than that of the interposer cladding 225, and the interposer waveguides 224A and 224B may have an effective index in a range from 1.50 to 1.65. Effective index is defined as the overlap integral of the optical field with the refractive index profile of the waveguide. Consider an SiN waveguide with an $SiO_2$ cladding. Importantly, as the SiN waveguide width is reduced in a taper, the effective index reduces since a larger fraction of the optical mode overlaps with the surrounding lower index $SiO_2$. Note that the low end of the range of effective index for the interposer waveguide mode is determined by the minimum taper tip width afforded by the SiN fabrication process, which here is assumed to be on the order of 200 nm. For instance, the minimum taper tip width for SiN waveguides may be 180 nm. If the process allows for a smaller tip width for the SiN, a correspondingly lower refractive index for the interposer will be allowed. This is because adiabatic coupling transition occurs when the effective indices of the SiN waveguide and interposer waveguide are substantially the same. Decreasing the SiN tip width reduces the effective index of the SiN waveguide allowing a lower material index for the interposer.

It can be seen from FIG. 3A that, although the second and third interposer waveguides 224A and 224B are displaced in the y direction from the first SiN waveguide 208, the coupler portion of the interposer SiN waveguides 224A and 224B is nevertheless aligned in the x and z directions with the tapered end of the first SiN waveguide 208 such that the coupler portion of the interposer waveguide 224A overlaps the tapered end of the SiN waveguide 208 (as seen in the view 300A) and is parallel thereto (as seen in the view 300B).

The views 300C-300H of FIGS. 3B-3G depict widths (e.g., in the x direction) of the tapered end of each of the Si waveguide 212 and the SiN waveguides 208, 224A, and 224B at, respectively, reference lines 1-7 of FIG. 3A. For instance, from the view 300C, it can be seen that a width of the Si waveguide 212 tapers from a width $w_{Si1}$ of about 0.32 μm at reference line 1 to a width $w_{Si2}$ of about 0.08 μm (or 80 nm) at reference line 2 of FIG. 3A.

Comparing the views 300C and 300D of FIG. 3B, the thickness of the second SiN waveguide 224A reverse tapers (i.e., vertically increases) in thickness from a thickness $t_{224A1}$ of about 20 nm at reference line 1 (FIG. 3B) to an intermediate thickness $t_{224A3}$ of less than 0.25 μm at reference line (FIG. 3C). Further, the thickness of third SiN waveguide 224B remains constant at about 20 nm throughout all views 300C-300H. A thickness $t_{SiO2}$ of the oxide SiO2 separating the second SiN waveguide 224A and the third SiN waveguide 224B remains constant at about 1 μm throughout all views 300C-300H Also, from the views 300E and 300F, it can be seen that a width of the first SiN waveguide 208 tapers from a width $w_{SiN1}$ of about 1.0 μm at reference line 4 to a width $w_{SiN2}$ of about 0.20 μm (or 200 nm) at reference line 5. As another design example, the width $w_{SiN1}$ can be about 1.5 μm at reference line 4 tapered to the width $w_{SiN2}$ of about 0.08 μm at reference line 5.

The tapered ends of the Si waveguide 212 and the SiN waveguide 208 provide adiabatic transitions for optical signals from the Si waveguide 212 to the first SiN waveguide 208 and from the first SiN waveguide 208 to the second SiN waveguide 224A, or adiabatic transitions for optical signals traveling in the opposite direction. An adiabatic transition may be achieved by changing the structure and/or an effective index of the tapered ends of the Si and the first SiN waveguides 212 and 208 in a sufficiently slow manner so light is not scattered from its mode when it is incident on the tapered ends and continues propagating in this same mode when it exits the tapered ends and enters the coupler portion of the second SiN waveguide 208 or the second SiN waveguide 224A on the interposer. That is, the light may experience a gradual transition between the tapered end of the Si waveguide 212 or the first SiN waveguide 208 and the y-axis displaced and adjacent coupler portion of the first SiN waveguide 208 or the second SiN waveguide 224A such that the mode does not change and no significant scattering of light takes place. Accordingly, the tapered end of the Si waveguide 212 combined with the coupler portion of the first SiN waveguide 208 is an example of an adiabatic coupler region. The tapered end of the first SiN waveguide 208 and the coupler portion of the second SiN waveguide 224A is another example of an adiabatic coupler region.

Further, from the views 300G and 300H, from line 6 to line 7 it can be seen that a thickness of the second SiN waveguide 224A tapers from a thickness $t_{224A6}$ of about 250 nm at reference line 6 to a thickness $t_{224A7}$ of about 20 nm at reference line 7. The second SiN waveguide 224A and the third SiN waveguide 224B are separated by SiO2 having a thickness $t_{SiO2}$ of about 1 μm. While the thickness $t_{SiO2}$ is illustrated and described herein as about 1 μm, different processes may also defined different thicknesses for $t_{SiO2}$ including a thickness of 0.2 μm.

Figure 3G:
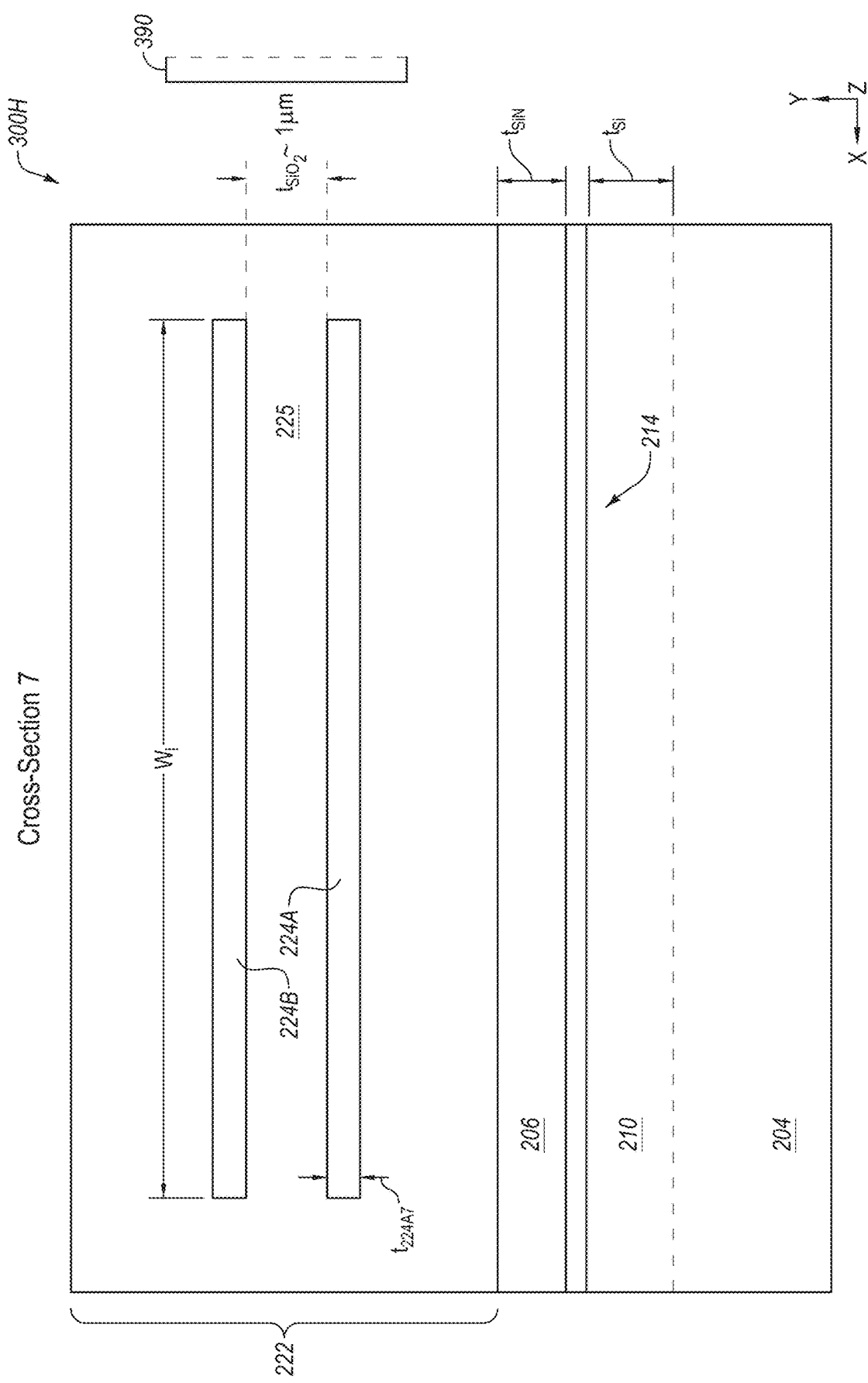

Yet further, from the view 300H, from reference line 7 extending to the right of FIG. 3G, the second SiN waveguide 224A and the third SiN waveguide 224B engage in optical coupling such that the SiN waveguides 224A and 224B engage in conversion from optical mode to fiber mode for coupling to an optical fiber such as a single-mode fiber (SMF) 390.

As illustrated in FIG. 3A through FIG. 3G, the second SiN waveguide 224A tapers or varies in thickness. Such thickness variation of a waveguide provides a higher index interposer which may ensure an improved effective index matching with the first SiN waveguide 208 of the Si PIC 102. Further, such a varying waveguide profile improves the TM mode coupling performance. Further, an adiabatic taper is required for coupling between the Si waveguide 212 and the first SiN waveguide 208, and for coupling between the first SiN waveguide 208 and the second SiN waveguide 224A. Such tapers may terminate with a finite tip size that may vary with process variations. Tapering and reversed tapering of the thickness of the waveguide is more tolerant to process variations. Further, thickness tailoring of a waveguide may further provide a better coefficient of thermal expansion (CTE).

One technique for thickness tapering of a waveguide, such as the second SiN waveguide 224A, may be performed using techniques, an example of which may be a TriPleX™ process by LioniX.

In operation, the structure, refractive index, and/or other characteristics of an optical medium may determine an effective index of the optical medium. Effective index is somewhat analogous to energy levels in quantum mechanics. Higher effective index is analogous to lower energy level. Thus, for two adjacent optical media with different effective indexes, light tends to propagate through the medium with the higher effective index.

In the embodiments described herein, and with particular reference to FIG. 3A through FIG. 3G, Si waveguides may generally have a higher effective index than SiN waveguides. By tapering the end of an Si waveguide, the effective index may be reduced along the length of the tapered end until the effective index of the Si waveguide approximately matches or even becomes smaller than the effective index of a y-axis displaced SiN waveguide, such as illustrated in FIG. 3A through FIG. 3G. Accordingly, light propagating through the Si waveguide 212 and exiting through its tapered end may exit the tapered end of the Si waveguide 212 and enter the first SiN waveguide 208 about at a point where the effective index of the tapered end of the Si waveguide 212 matches an effective index of the first SiN waveguide 208. Analogously, the first SiN waveguide 208 may be tapered at its end until its effective index approximately matches or even becomes smaller than the effective index of a y-axis displaced second SiN waveguide 224A, such as illustrated in FIG. 3A through FIG. 3G. Accordingly, light propagating through the first SiN waveguide 208 and exiting through its tapered end may exit the tapered end of the first SiN waveguide 208 and enter the second SiN waveguide 224A on the interposer 104 about at a point where the effective index of the tapered end of the first SiN waveguide 208 matches an effective index of the second SiN waveguide 224A.

Very fine dimensions may be required to adiabatically couple light from a Si waveguide directly to a polymer (or other material) interpose waveguide. Such fine dimensions may not be achievable for some fabs/manufacturers and/or may be inconsistent with existing processes of these fabs/manufacturers. In addition, smaller Si waveguides generally have higher insertion loss than relatively larger Si waveguides, making them disadvantageous. The adiabatic coupling length between Si and Polymer interposer waveguides may be on the order of 2 mm, over which such a narrow Si waveguide would introduce unwanted optical loss.

The embodiments described herein implement a two-stage adiabatic coupling where the first SiN waveguide has an intermediate index of refraction between that of the Si waveguide and of the second SiN waveguide, such that the effective index of the Si waveguide may be matched to the effective index of the SiN waveguide by fabricating the SiN waveguide and/or its tapered end with larger dimensions that are achievable by the fabs/manufacturers and that allow the use of a larger, lower loss SiN waveguide. Here, the adiabatic coupling length from the Si waveguide to the first SiN waveguide may be quite small, e.g., about 50-200 μm. In this case the higher loss of the small ~80 nm wide Si waveguide does not introduce significant loss and the loss is significantly less than the narrower Si waveguide over 2 mm as described above. The adiabatic coupler region between the first SiN waveguide and the second SiN waveguide may be around 2 mm, where the lower loss of the second SiN waveguide relative to the first Si waveguide leads to less loss as compared with direct adiabatic coupling between Si and interposer waveguides.

Figure 4:
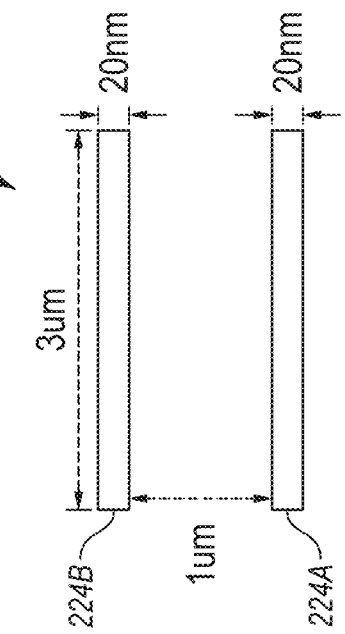
FIG. 4 includes graphical representations of simulated light modes in an interposer waveguide strip.
Figure 4:
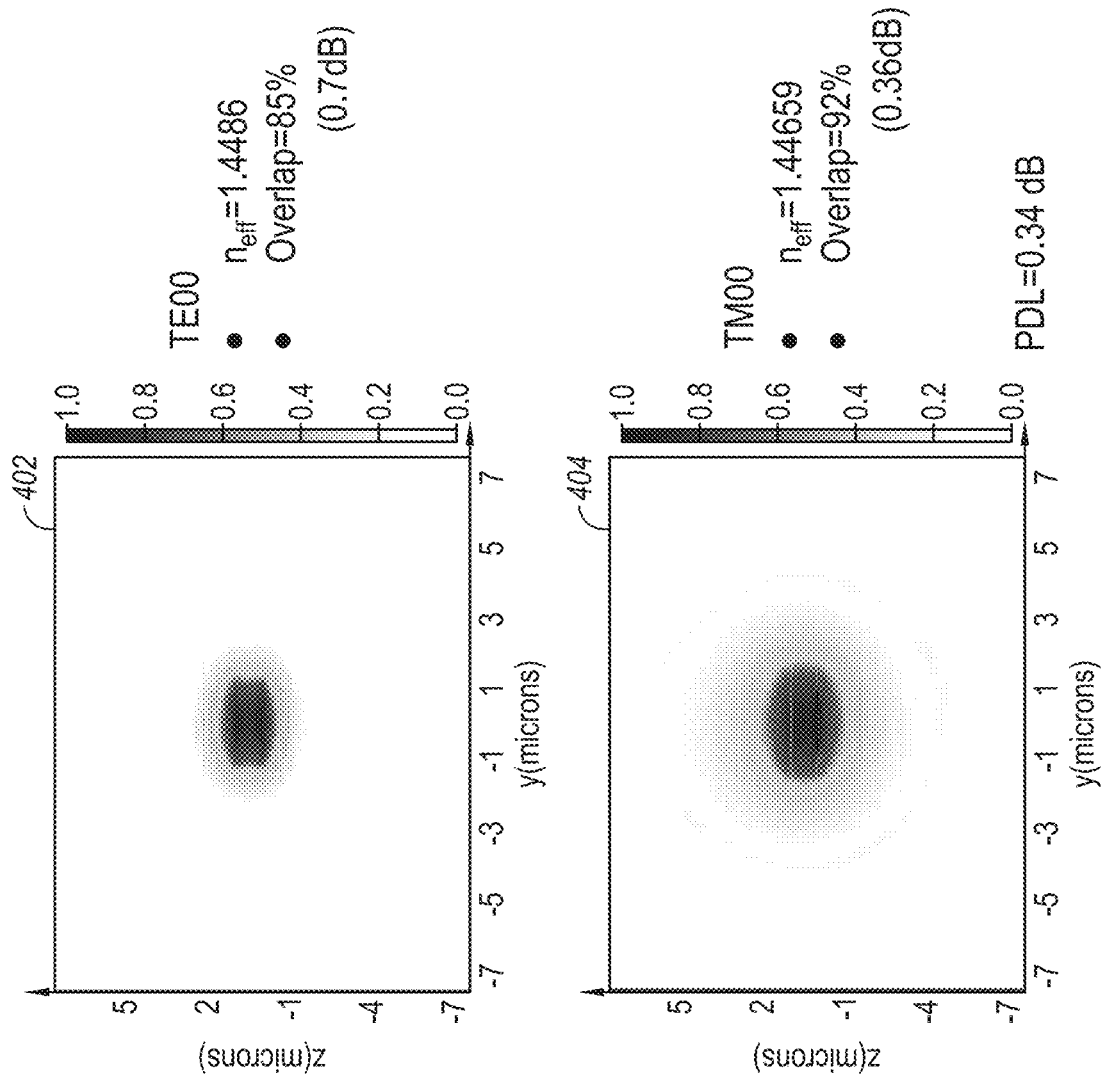

FIG. 4 includes graphical representations of simulated light modes of TE and TM polarized light in the interposer waveguide strip 222 including the second SiN waveguide 224A and the third SiN waveguide 224B of FIG. 3G, arranged in accordance with at least one embodiment described herein. Plot 402 illustrates TE mode coupling between the interposer waveguide strip 222 and the SMF 390 of FIG. 3G. As illustrated, the TE mode couples with about an 85% mode overlap with the SMF which equates to approximately 0.7 dB. Further, plot 404 illustrates TM mode coupling between the interposer waveguide strip 222 and the SMF 390 of FIG. 3G. As illustrated, the TM mode couples with about a 92% mode overlap with the SMF which equates to approximately 0.36 dB.

Figure 5A:
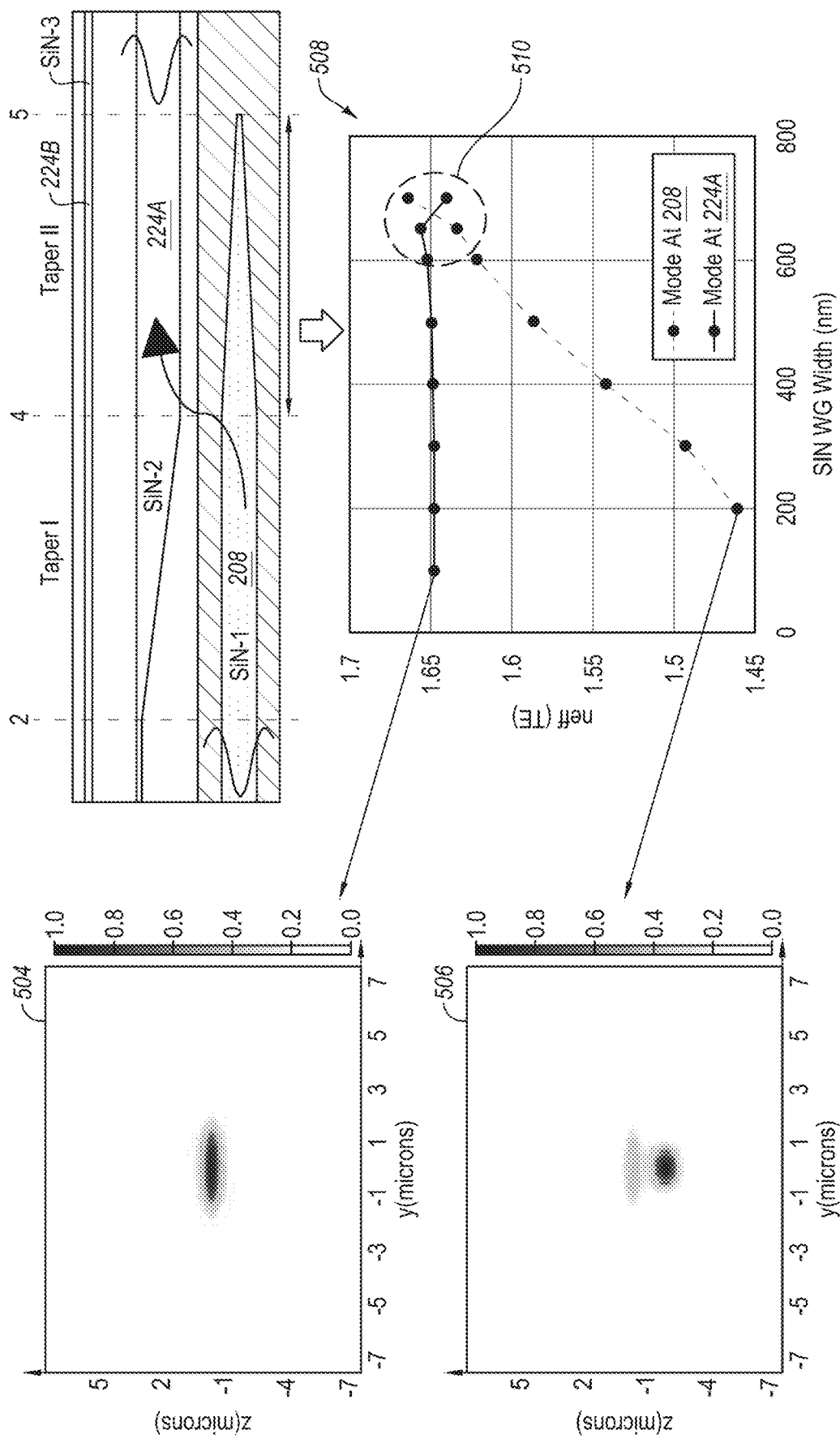
FIGS. 5A-5B illustrate plots relating to modes and effective indexes occurring in a taper of a waveguide.
Figure 5B:
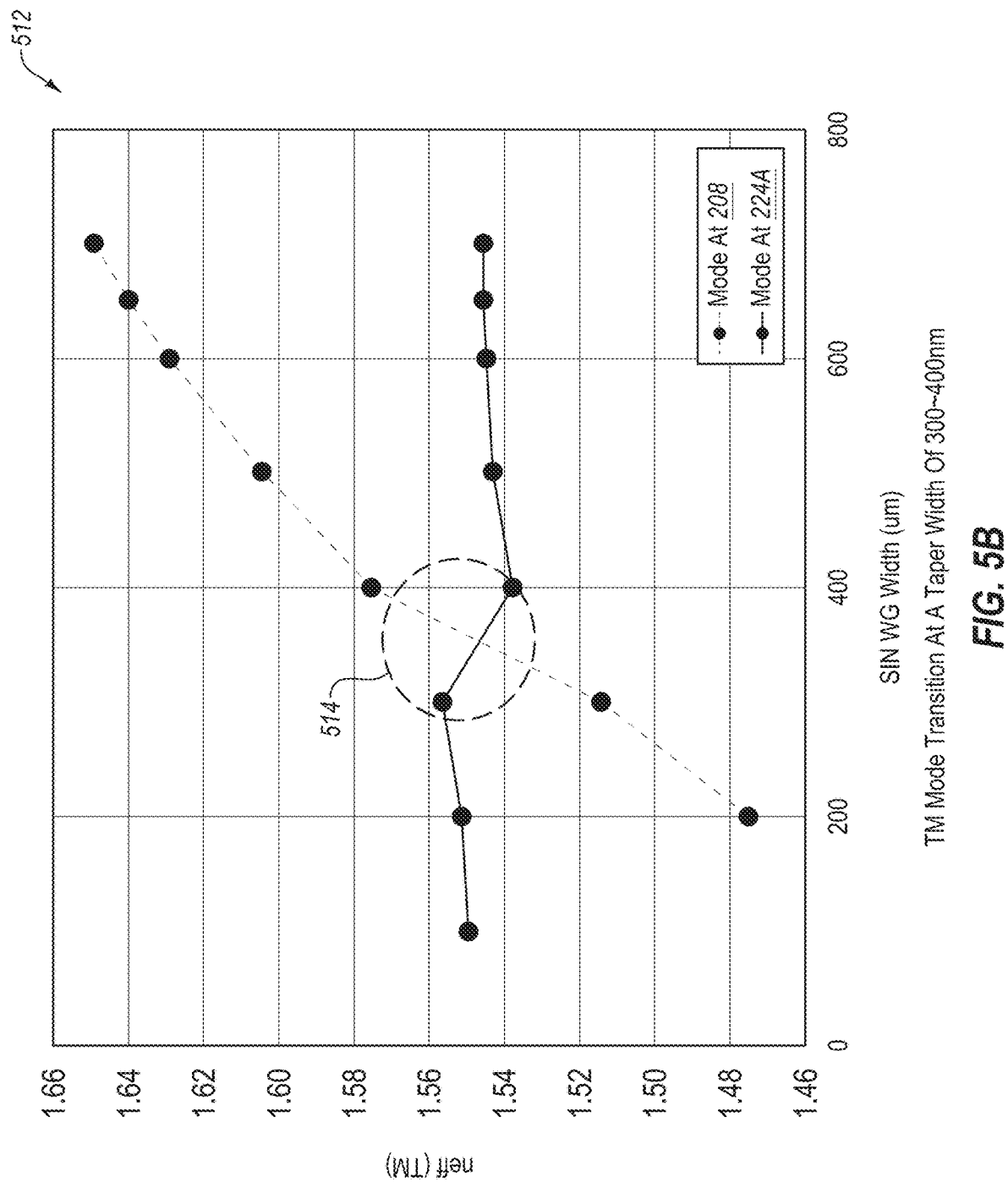

FIGS. 5A and 5B illustrate plots relating to modes and effective indexes occurring in a taper of a waveguide between the reference lines 4 and 5 of FIG. 3A, arranged in accordance with at least one embodiment described herein. A mode profile plot 504 illustrates the mode in the second SiN waveguide 224A and the mode profile plot 506 illustrates the mode in the first SiN waveguide 208. It is noted that the second SiN waveguide 224A is illustrated as a cross-sectional view of the waveguide while the first SiN waveguide 208 is illustrated as a top view in order to illustrate the relationships of the tapering of both waveguides.

In FIG. 5A, plot 508 illustrates a coupling region 510 where the effective indexes for the TE modes are compatible for evanescence coupling between the first SiN waveguide 208 and the second SiN waveguide 224A. In FIG. 5B, plot 512 illustrates a coupling region 514 where the effective indexes for the TM modes are compatible for evanescence coupling between the first SiN waveguide 208 and the second SiN waveguide 224A.

Figure 6:
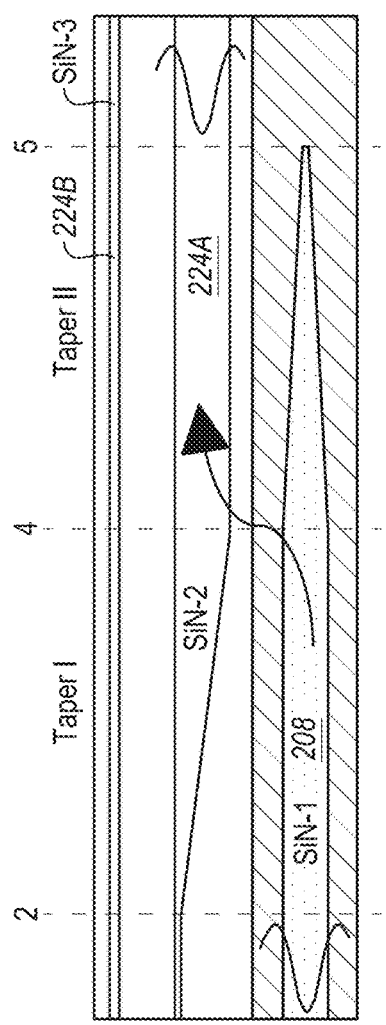
FIG. 6 illustrates plots relating to taper length and coupling efficiency for waveguides in the system.
Figure 6:
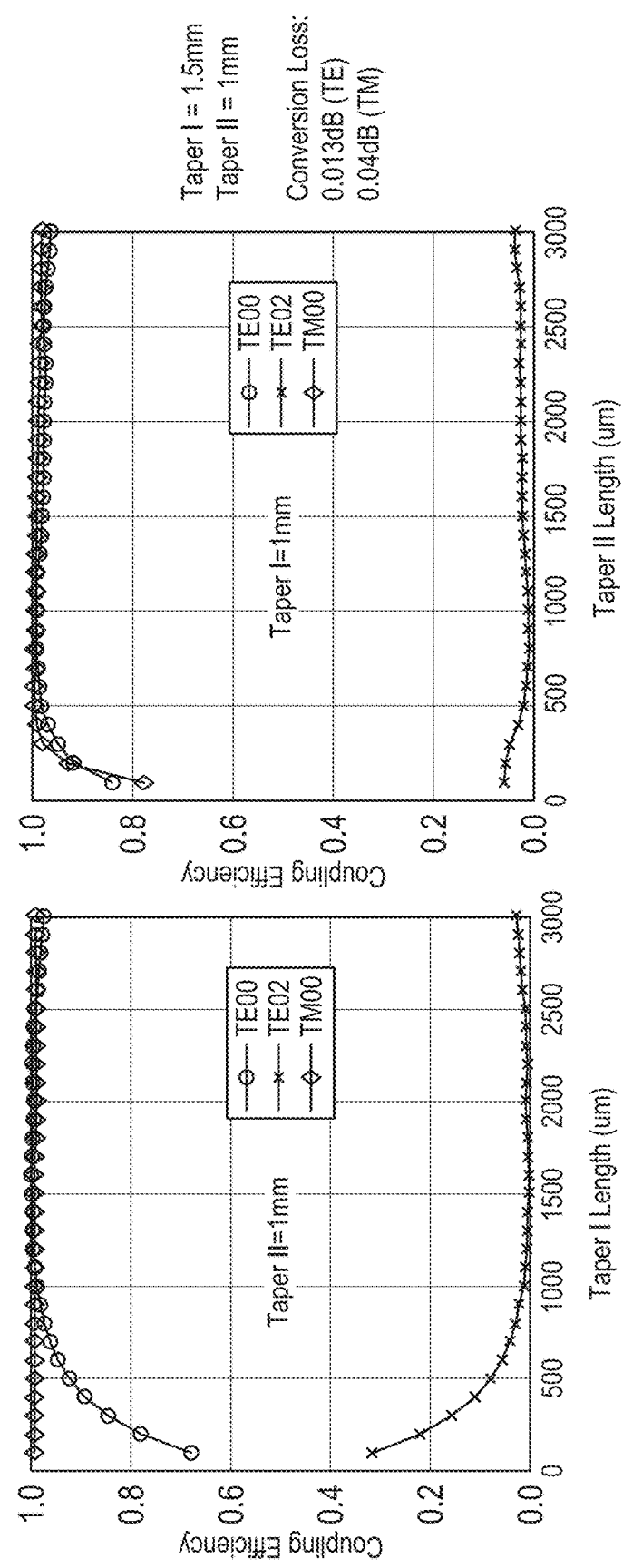

FIG. 6 illustrates plots relating to taper length and coupling efficiency for waveguides in the example system 100 of FIG. 1A, arranged in accordance with at least one embodiment described herein. The length of each of the tapers provides for further optimization of the coupling efficiency. Generally, an increased taper length improves the coupling efficiency for various modes. Taper I relates to the vertical taper for the second SiN waveguide 224A and taper II relates to the horizontal (lateral) taper for the first SiN waveguide 208. In one example illustrated in FIG. 6, when the length of Taper I for the second SiN waveguide 224A is approximately 1.5 mm and the length of the Taper II for the first SiN waveguide 208 is approximately 1 mm, then the conversion loss for the TE mode is approximately 0.013 dB and the conversion loss for the TM mode is approximately 0.04 dB. Further, the plots of FIG. 6 illustrate that most of the coupling occurs with respect to the fundamental mode.

Figure 7:
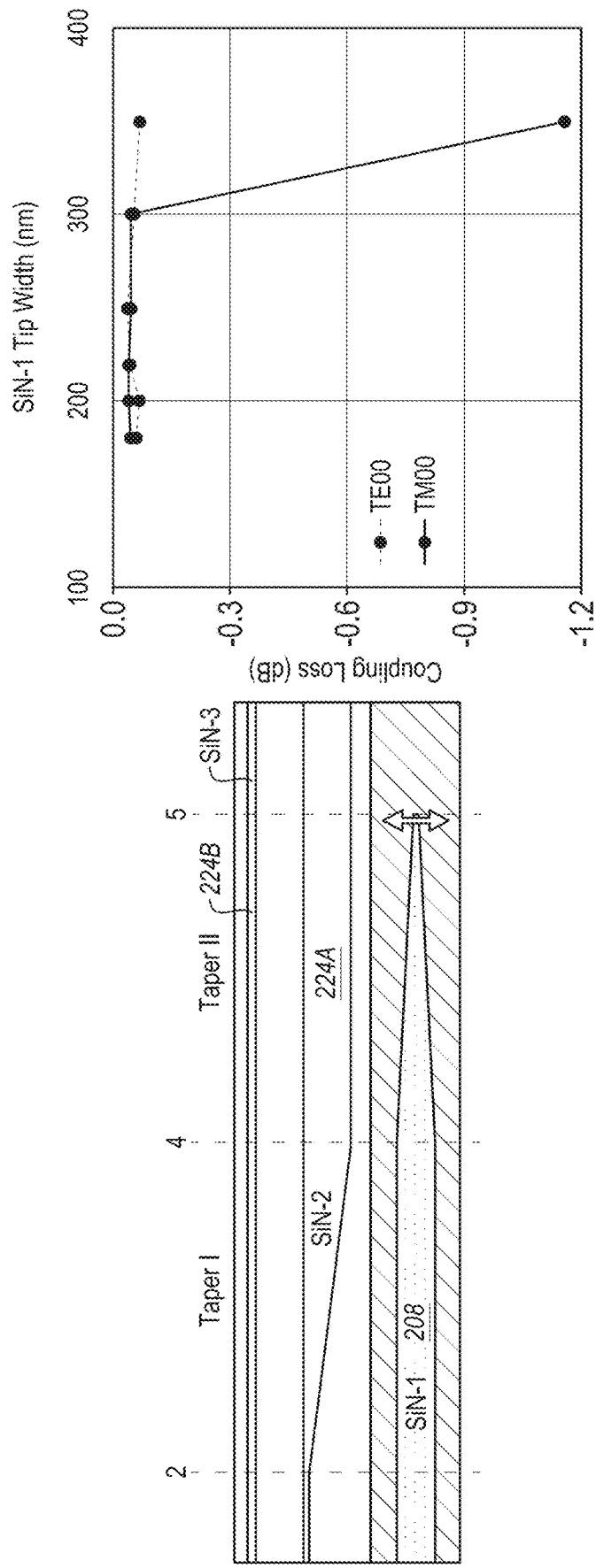
FIG. 7 illustrates the effect of tip size of a first SiN waveguide with respect to coupling loss with a second SiN waveguide in a system.

FIG. 7 illustrates the effect of tip size of the first SiN waveguide 208 with respect to the coupling loss with the second SiN waveguide 224A, arranged in accordance with at least one embodiment described herein. As illustrated, processes do not need excessive precision to accommodate a very small tip width since coupling loss remains negligible for tip widths as large as approximately 300 nm.

Figure 8:
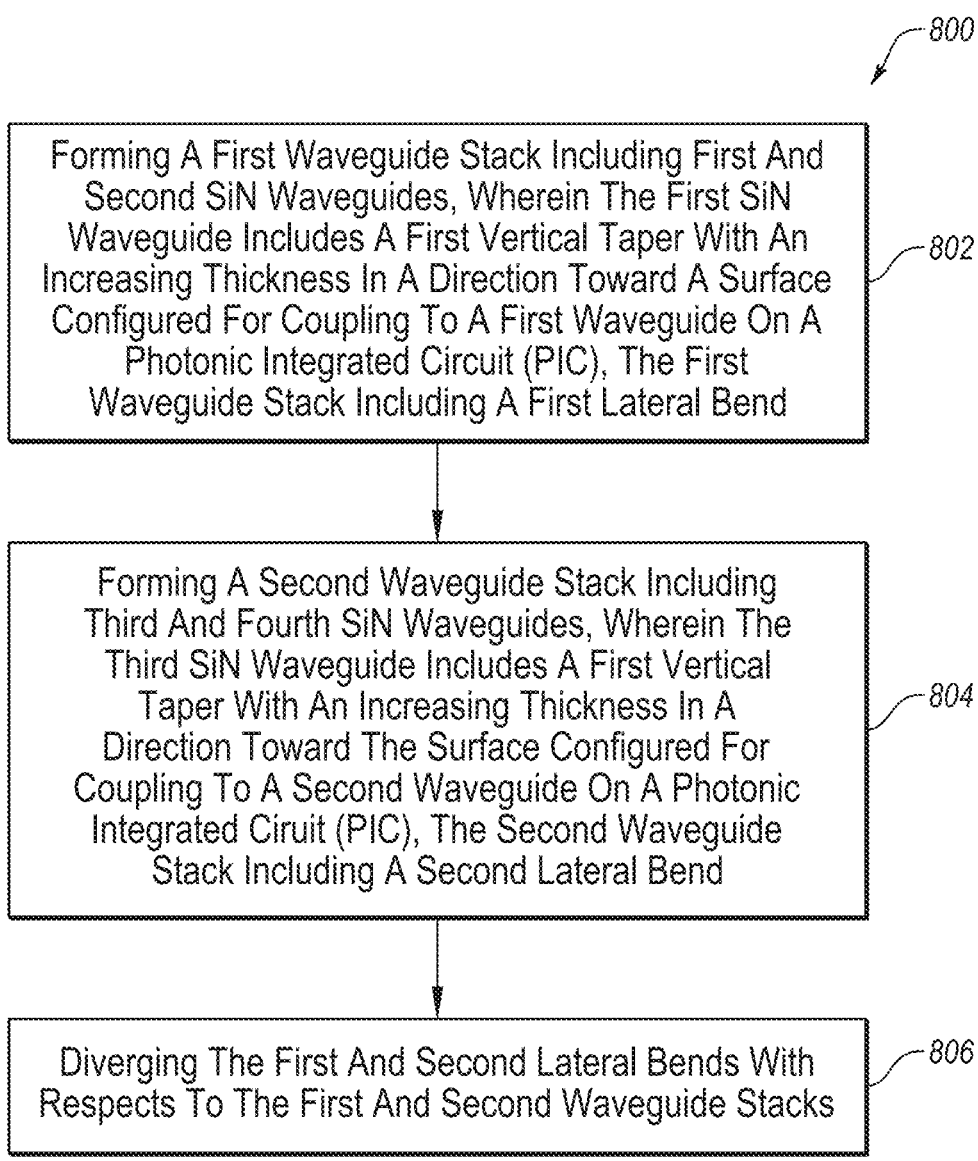
FIG. 8 is a flowchart of a method to form a fan-out interposer to couple optical signals from a PIC to an SMF.

FIG. 8 is a flowchart of a method 800 to form a fan-out interposer to couple an optical signal from a PIC to an SMF, arranged in accordance with at least one embodiment described herein. The method 800 includes a step 802 for forming a first waveguide stack including first and second SiN waveguides, wherein the first SiN waveguide includes a first vertical taper with an increasing thickness in a direction toward a surface configured for coupling to a first waveguide on a photonic integrated circuit (PIC), the first waveguide stack including a first lateral bend.

The method 800 further includes a step 804 for forming a second waveguide stack including third and fourth SiN waveguides, wherein the third SiN waveguide includes a first vertical taper with an increasing thickness in a direction toward the surface configured for coupling to a second waveguide on a photonic integrated circuit (PIC), the second waveguide stack including a second lateral bend.

The method 800 further includes a step 806 for diverging the first and second lateral bends with respect to the first and second waveguide stacks.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A fan-out interposer, comprising:
    a first upper silicon nitride (SiN) waveguide;
    a first lower SiN waveguide that extends parallel to and is displaced beneath the first upper SiN waveguide;
    a second upper SiN waveguide;
    a second lower SiN waveguide that extends parallel to and is displaced beneath the second upper SiN waveguide;
    wherein:
        the first lower SiN waveguide includes a first vertical taper that increases in thickness vertically away from the first upper SiN waveguide along a length of the first vertical taper;
        the first upper and lower SiN waveguides include a first lateral bend;
        the second lower SiN waveguide includes a second vertical taper that increases in thickness vertically away from the second upper SiN waveguide along a length of the second vertical taper;
        the second upper and lower SiN waveguides include a second lateral bend; and the first and second lateral bends cause the first upper and lower SiN waveguides to laterally diverge from the second upper and lower SiN waveguides.

2. The fan-out interposer of claim 1, wherein: the first lower SiN waveguide includes a third vertical taper that decreases in thickness along a length of the third vertical taper to form a first adiabatic coupler between the first upper and lower SiN waveguides; the second lower SiN waveguide includes a fourth vertical taper that decreases in thickness along a length of the fourth vertical taper to form a second adiabatic coupler between the second upper and lower SiN waveguides.

3. The fan-out interposer of claim 2, wherein the first and second lower SiN waveguides respectively terminate after the third and fourth vertical tapers.

4. The fan-out interposer of claim 1, wherein the first upper and lower SiN waveguides and the second upper and lower SiN waveguides have a first lateral pitch of 100 micrometers prior to the first and second lateral bends and a second lateral pitch of 250 micrometers after the first and second lateral bends.

5. The fan-out interposer of claim 1, wherein the first and second vertical tapers each increases in thickness vertically from 20 nanometers to 250 nanometers along the lengths of the first and second vertical tapers.

6. The fan-out interposer of claim 1, wherein the first upper and lower SiN waveguides are vertically separated by a distance of 200 nanometers.

7. A method, comprising:
forming a first waveguide stack including first and second silicon nitride (SiN) waveguides, wherein the first SiN waveguide includes a first vertical taper with an increasing thickness in a direction toward a surface configured for coupling to a first waveguide on a photonic integrated circuit (PIC), the first waveguide stack including a first lateral bend;
forming a second waveguide stack including third and fourth SiN waveguides, wherein the third SiN waveguide includes a first vertical taper with an increasing thickness in a direction toward the surface configured for coupling to a second waveguide on a photonic integrated circuit (PIC), the second waveguide stack including a second lateral bend; and
diverging the first and second lateral bends with respect to the first and second waveguide stacks.

8. The method of claim 7,
wherein forming the first waveguide stack includes forming a second vertical taper in the first SiN waveguide with a decreasing thickness in a direction away from the surface configured for coupling to the PIC, the decreasing thickness causing adiabatic optical coupling between the first SiN waveguide and the second SiN waveguide, and
wherein forming the second waveguide stack includes forming a second vertical taper in the third SiN waveguide with a decreasing thickness in a direction away from the surface configured for coupling to the PIC, the decreasing thickness causing adiabatic optical coupling between the third SiN waveguide and the fourth SiN waveguide.

9. The method of claim 8, wherein the first and third SiN waveguides terminate after decreasing in thickness.

10. The method of claim 7, wherein the forming the first waveguide stack and the forming the second waveguide stack further comprise forming the first and second waveguide stacks to diverge from a first pitch of 100 micrometers to a second pitch of 250 micrometers.

11. The method of claim 7, further comprising vertically tapering the first and third SiN waveguides from a first thickness of 20 nanometers at a first end of each of the first vertical tapers to a second thickness of 250 nanometers at a second end of each of the first vertical tapers.

12. The method of claim 7, further comprising diverging the first waveguide stack and the second waveguide stack from a first pitch of 100 micrometers to a second pitch of 250 micrometers.

* * * * *